(12) United States Patent
Kwak et al.

(10) Patent No.: US 11,368,980 B2
(45) Date of Patent: Jun. 21, 2022

(54) MONITORING CONTROL CHANNELS IN CONTROL RESOURCE SETS FOR NEW RADIO

(71) Applicant: APPLE INC., Cupertino, CA (US)

(72) Inventors: Yongjun Kwak, Portland, OR (US);
Seunghee Han, San Jose, CA (US);
Gang Xiong, Portland, OR (US);
Kyeongin Jeong, Portland, OR (US);
Dae Won Lee, Portland, OR (US)

(73) Assignee: APPLE INC., Cupertino, CA (US)

( * ) Notice: Subject to any disclaimer, the term of this patent is extended or adjusted under 35 U.S.C. 154(b) by 138 days.

(21) Appl. No.: 16/463,971

(22) PCT Filed: Mar. 6, 2018

(86) PCT No.: PCT/US2018/021212
§ 371 (c)(1),
(2) Date: May 24, 2019

(87) PCT Pub. No.: WO2018/165202
PCT Pub. Date: Sep. 13, 2018

(65) Prior Publication Data
US 2020/0389917 A1     Dec. 10, 2020

Related U.S. Application Data

(60) Provisional application No. 62/474,506, filed on Mar. 21, 2017, provisional application No. 62/468,217, filed on Mar. 7, 2017.

(51) Int. Cl.
*H04W 74/04*     (2009.01)
*H04W 48/10*     (2009.01)
(Continued)

(52) U.S. Cl.
CPC .......... *H04W 74/04* (2013.01); *H04W 48/10* (2013.01); *H04W 74/004* (2013.01);
(Continued)

(58) Field of Classification Search
CPC ... H04W 74/04; H04W 48/10; H04W 74/004; H04W 74/006; H04W 74/08; H04W 74/002
See application file for complete search history.

(56) References Cited

U.S. PATENT DOCUMENTS 10,165,602 B2 *  12/2018  Yang ................. H04W 72/12
2011/0013542 A1 *  1/2011  Yu .................... H04W 74/006
                                              370/280

(Continued)

OTHER PUBLICATIONS

3GPP TSG RAN WG1 Mtg #86bis; Title: RAN1 Chairman's Notes; Oct. 10-14, 2016; Lisbon, Portugal.

(Continued)

*Primary Examiner* — Jutai Kao

(57) ABSTRACT

Technology for an apparatus of a user equipment (UE), operable to perform a random-access procedure using a UE-specific control resource set (CORESET) is disclosed. The UE can decode a 5 message, received from the next generation node B (gNB), to perform a contention free random-access (RA) procedure. The UE can encode a random-access channel (RACH) preamble for transmission to the gNB using one or more UE-specific CORESET. The UE can decode a random-access response (RAR) received from the gNB in response to the RACH preamble transmission using the one or more UE10 specific CORESET.

14 Claims, 14 Drawing Sheets

(51) Int. Cl.
*H04W 74/00* (2009.01)
*H04W 76/20* (2018.01)
*H04W 74/08* (2009.01)

(52) U.S. Cl.
CPC ..... *H04W 74/006* (2013.01); *H04W 74/0833* (2013.01); *H04W 76/20* (2018.02)

(56) References Cited

U.S. PATENT DOCUMENTS

| | | | |
|---|---|---|---|
| 2014/0301330 A1 | 10/2014 | Lee et al. | |
| 2015/0009936 A1* | 1/2015 | Quan | H04L 1/189 |
| | | | 370/329 |
| 2018/0014143 A1* | 1/2018 | Rico Alvarino | H04W 72/005 |
| 2018/0184410 A1* | 6/2018 | John Wilson | H04L 5/001 |
| 2018/0206247 A1* | 7/2018 | Sun | H04W 72/085 |
| 2018/0212736 A1* | 7/2018 | Chatterjee | H04L 5/0094 |
| 2019/0200249 A1* | 6/2019 | Yoon | H04L 5/0057 |
| 2020/0045741 A1* | 2/2020 | Ohlsson | H04W 74/0833 |
| 2020/0128585 A1* | 4/2020 | Kuang | H04L 5/0053 |
| 2020/0128587 A1* | 4/2020 | Qian | H04W 56/0045 |

OTHER PUBLICATIONS

3GPP TSG RAN WG1 Mtg NR Ad-Hoc; Title: RAN1 Chairman's Notes; Jan. 16-20, 2017; Spokane, USA.
3GPP TSG RAN WG1 Mtg #88; R1-1702093; Title: DL control search space design; Agenda Item: 8.1.3.1.4; Feb. 13-17, 2017; Athens, Greece.
3GPP TSG RAN WG1 Mtg #88; R1-1702066; Title: Further details on NR 4-step RA Procedure; Agenda Item: 8.1.1.4.2; Feb. 13-17, 2017; Athens, Greece.
Panasonic, "Configuration of DL control resource set and UE bandwidth", R1-1700639, 3GPP TSG-RAN WG1 NR AdHoc, Spokane, Washington, Agenda Item 5.1 3.1, Jan. 16-20, 2017, 5 pages.

* cited by examiner

MONITORING CONTROL CHANNELS IN CONTROL RESOURCE SETS FOR NEW RADIO

BACKGROUND

Wireless systems typically include multiple User Equipment (UE) devices communicatively coupled to one or more Base Stations (BS). The one or more BSs may be Long Term Evolved (LTE) evolved NodeBs (eNB) or New Radio (NR) next generation NodeBs (gNB) that can be communicatively coupled to one or more UEs by a Third-Generation Partnership Project (3GPP) network.

Next generation wireless communication systems are expected to be a unified network/system that is targeted to meet vastly different and sometimes conflicting performance dimensions and services. New Radio Access Technology (RAT) is expected to support a broad range of use cases including Enhanced Mobile Broadband (eMBB), Massive Machine Type Communication (mMTC), Mission Critical Machine Type Communication (uMTC), and similar service types operating in frequency ranges up to 100 GHz.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
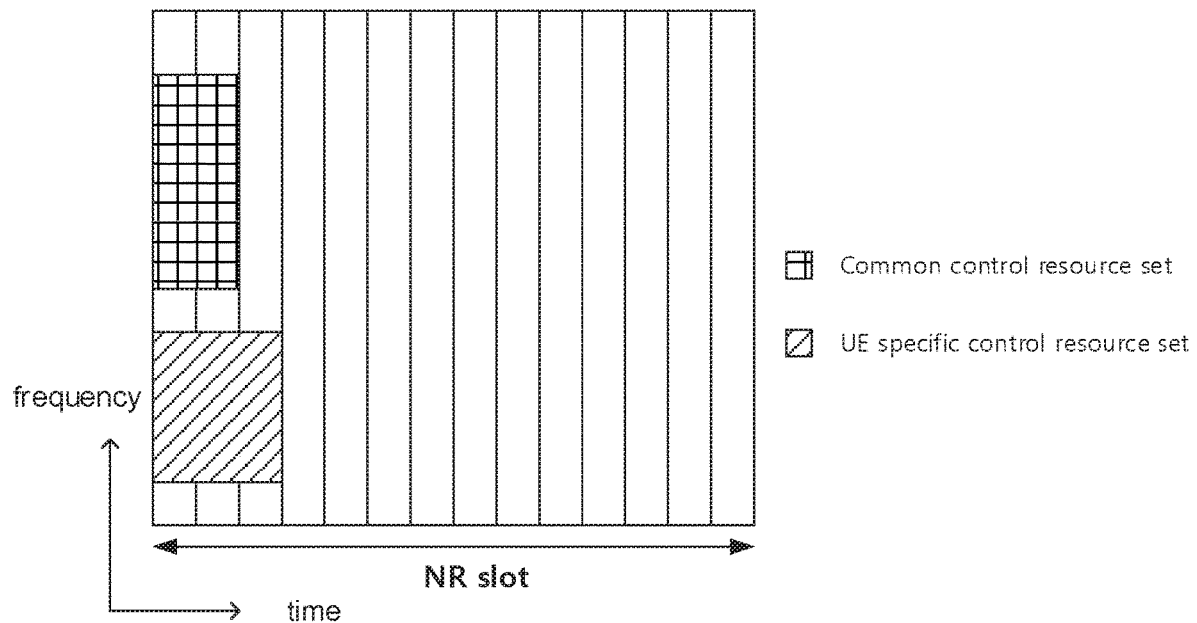
FIG. 1 multiple control resource sets for a new ratio, in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in uplink (UL). Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems (e.g., Release 14 and earlier), the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). In 3GPP fifth generation (5G) LTE communication systems, beginning with 3GPP Release 15, the node is commonly referred to as a new radio (NR) or next generation Node B (gNodeB or gNB). The downlink (DL) transmission can be a communication from the node (e.g., eNodeB or gNodeB) to the wireless device (e.g., UE), and the uplink (UL) transmission can be a communication from the wireless device to the node.

Wireless systems typically include multiple User Equipment (UE) devices communicatively coupled to one or more Base Stations (BS). The one or more BSs may be Long Term Evolved (LTE) evolved NodeBs (eNB) or New Radio (NR)

next generation NodeBs (gNB) that can be communicatively coupled to one or more UEs by a Third-Generation Partnership Project (3GPP) network. The UE can be one or more of a smart phone, a tablet computing device, a laptop computer, an internet of things (IOT) device, and/or another type of computing devices that is configured to provide digital communications. As used herein, digital communications can include data and/or voice communications, as well as control information.

As used herein, the term "Base Station (BS)" includes "Base Transceiver Stations (BTS)," "NodeBs," "evolved NodeBs (eNodeB or eNB)," and/or "next generation NodeBs (gNodeB or gNB)," and refers to a device or configured node of a mobile phone network that communicates wirelessly with UEs.

Mobile communication has evolved significantly from early voice systems to today's highly sophisticated integrated communication platform. The next generation wireless communication system, 5G or new radio (NR) will provide access to information and sharing of data anywhere, anytime by various users and applications. NR is expected to be a unified network/system that target to meet vastly different and sometime conflicting performance dimensions and services. Such diverse multi-dimensional requirements are driven by different services and applications. In general, NR will evolve based on 3GPP LTE-Advanced with additional potential new Radio Access Technologies (RATs) to enrich people lives with better, simple and seamless wireless connectivity solutions. NR will enable everything connected by wireless and deliver fast, rich contents and services.

In one embodiment, for a single-stage downlink control information (DCI) design, there can be a control resource set (CORESET) (formerly called control subband) that is, in the frequency domain, a set of physical resource blocks (PRBs) within which the UE is configured to attempt to blindly decode downlink control information. Within this CORESET, the PRBs may or may not be frequency contiguous. Additionally, a UE may have one or more control resource sets. Additionally, one DCI message can be located within one control resource set.

In one embodiment, in the frequency domain, a PRB is the resource unit size (which may or may not include a demodulation reference signal (DM-RS)) for a control channel. Additionally, the time/frequency resource containing at least one search space can be obtained from a master information block (MIB) or other type of system information that can be implicitly derived from initial access information. The time frequency resource containing additional search spaces can be configured using dedicated radio resource control RRC signaling.

In another embodiment, a CORESET is defined as a set of resource element groups (REGs) under a given numerology. Each REG is comprised of a selected number of resource elements. A control search space (CSS) can include at least an aggregation level(s), a number of decoding candidates for each aggregation level, and a set of control channel elements (CCEs) for each decoding candidate.

FIG. 1 illustrates an example of multiple control resource sets for a new ratio. As mentioned above, multiple control resource sets (CORESETs) can be configured for a UE. In order to support the transmission of the common channel, comprising a common DCI, paging, and system information blocks (SIBs), there can be one common CORESET configured for a UE. In addition, it is also possible to configure a UE-specific CORESET for the transmission of UE-specific data channels. It is also possible that a UE-specific data channel can be transmitted using a common CORESET.

FIG. 1 provides an example illustrating a possible resource allocation for a common CORESET and a UE-specific CORESET in a slot from a UE perspective.

Mechanisms to Utilize Control Resource Sets for Random Access Procedure

In one example, at least a common CORESET can be configured for a UE and the common CORESET can be configured using system information. For example, new radio (NR) system information can be transmitted to a NR UE using three different channels. A first channel can be a NR PBCH (Physical Broadcast Channel) that can be used for the transmission of a portion of system information, referred to as a minimum system information. This portion can be referred to as the MIB (Master Information Block) hereafter. A second channel can be a NR sPBCH (Secondary Physical Broadcast Channel) for the transmission of the remaining minimum system information, which can be referred to as an mSIB (minimum System Information Block) hereafter. A third channel can be the NR PDSCH (Physical Downlink Shared Channel), which can be used for the transmission of remaining system information, which can be referred to as a System Information Block (SIB) hereafter.

Since the common CORESET is typically known to a UE for the reception of the physical downlink control channel (PDSCH), the common CORESET can be configured by either the PBCH or the sPBCH. If the common CORESET is configured, the UE can monitor the control channels inside the common CORESET and receive the corresponding NR PDSCH after that.

As such, it is not clear when a UE-specific CORESET can be configured and from what time the UE-specific CORESET can be utilized by a UE. The configuration of a UE-specific CORESET can be done at least just after the random access procedure.

Figure 2:
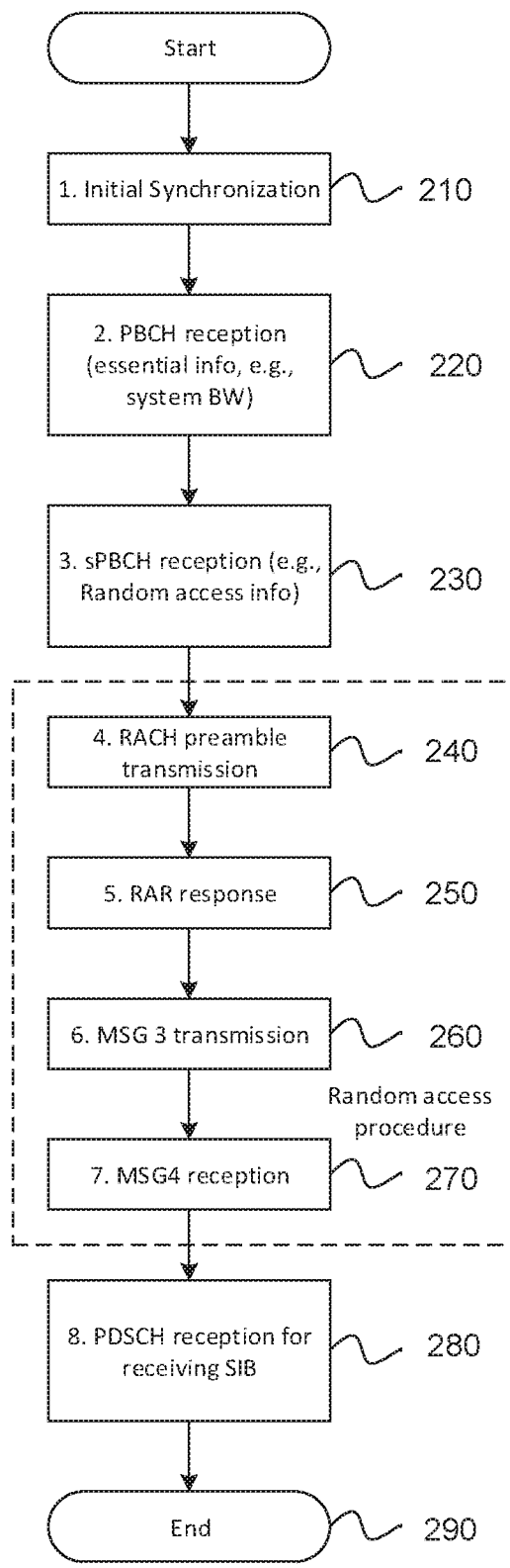
FIG. 2 illustrates a configuration of user equipment (UE)-specific control resource set (CORESET) after a random access procedure, in accordance with an example.

FIG. 2 illustrates a configuration of user equipment (UE)-specific control resource set (CORESET) after a random access procedure. FIG. 2 illustrates an example of an entire initial access procedure. When a UE starts the initial access, it can first perform an initial synchronization by detecting synchronization signals 210, such as a primary synchronization signal and a secondary synchronization signal. A PBCH 220 can be received to obtain the most essential system information (i.e. MIB), and receive a sPBCH 230 to receive additional system information (i.e. mSIB). The mSIB can include random access procedure configuration information.

Operations 4-7 illustrated in FIG. 2 comprise the random access procedure. For the random access procedure, a random access response (RAR) can be transmitted from the UE using a PDCCH inside a common CORESET. The RAR in operation four of FIG. 2 is commonly referred to as a message two (MSG2). The PDCCH can also include information regarding scheduled PDSCH resources. Accordingly, the common CORESET can be configured before operation 4 240. After that, the UE can perform the random access procedure (operations 4, 5, 6, and 7) 240-270. The UE can then receive the PDSCH 280 for receiving all other system information (SIBs), which ends the initial access procedure 290.

However, the random access procedure (step 4-7) 240-270 may not be used only for the initial access. This procedure can be utilized for a UE for other purposes, such as uplink synchronization, handover, and so forth. Additionally, depending on the purpose of the random access procedure, the UE behavior can be changed. For example, a random access procedure can comprise 4 operations for the initial access, but only 2 operations, including operation 4 240 and operation 5 250 in FIG. 2, are used for the uplink synchronization. Depending on the purpose of the random access procedure, appropriate UE behavior and utilization of the common and UE-specific CORESETs are proposed.

In one embodiment, the UE can utilize the common CORESET for the reception of message 2 (MSG 2) in operation four, message 4 (MSG4) in operation seven, and possibly for the transmission of message 3 (MSG3) in operation six of the random access procedure, which can be used for the initial access on the system for the first time by a UE.

The UE can utilize the UE-specific CORESET after the random access procedure using information obtained in, or prior to, the random access procedure to access the UE-specific CORESET. As previously discussed, the common CORESET can be configured before the random access procedure even for initial access procedure. Therefore, after the UE transmits a random access channel (RACH) preamble (operation 4 of FIG. 2), and receives the random access response (RAR, message 2) as shown in operation 5 of FIG. 2, the UE can still monitor the common CORESET to determine whether there is relevant information on the physical downlink control channel (PDCCH). In one embodiment, the information in the common CORESET can be masked with an identifier that is available to multiple UEs served by the gNB. For example, the common CORESET information can be masked with a Random Access Radio Network Temporary Identifier (RA-RNTI). If the UE detects one PDCCH in the common CORESET, it can determine a location of the corresponding physical downlink shared channel (PDSCH) which includes the RAR information. After that, in operation 6 of FIG. 2, the UE can transmit the message 3. The message 3 can include the UE's identity and other selected information and then in operation 7, the gNB can transmit the message 4. Message 4 can include information regarding contention resolution along with additional information. It is possible that the UE-specific CORESET configuration can be included in this message 4. When the UE receives message 4, the UE-specific CORESET can be configured for the UE. Therefore, after the random access procedure, the UE can monitor both common CORESET, using a common identifier, and the UE-specific CORESET, using a UE-specific identifier, for the reception of downlink control channels and downlink shared channels. It is possible that more than one UE-specific CORESETs can be configured for a single UE.

In another embodiment of the invention, the UE can utilize the UE-specific CORESET for the reception of message 2, in operation 5 of the random access procedure, which is used for the uplink synchronization for the connected-mode UE. This may occur after the UE has first accessed the gNB. In this example, the connected-mode UE, which already has all configuration information for UE-specific CORESET(s), may lose uplink synchronization. If the gNB detects that the UE is out of synchronization in uplink, the gNB can notify the UE that a contention free random access procedure is desired. Note that there can be other purposes for the contention free random access than uplink synchronization. In that case, the UE can perform the contention free random access procedure which typically consists of only two operations (operation 4 240 and operation 5 250 in FIG. 2). Since the UE that performs contention free random access is a connected mode UE, both the common CORESET and the UE-specific CORESET are previously configured. Accordingly, the UE can utilize either CORESET for the reception of the RAR message in step 5 250 of FIG. 2.

Therefore, a NR UE behavior can be defined differently between contention based random access (i.e. a first interaction of the UE with the gNB), where only the common CORESET is typically used for the reception of the RAR message in message 2, and the contention free random access, where either the common CORESET or the UE-specific CORESET is used for the reception of the RAR message of message 2.

Figure 3:
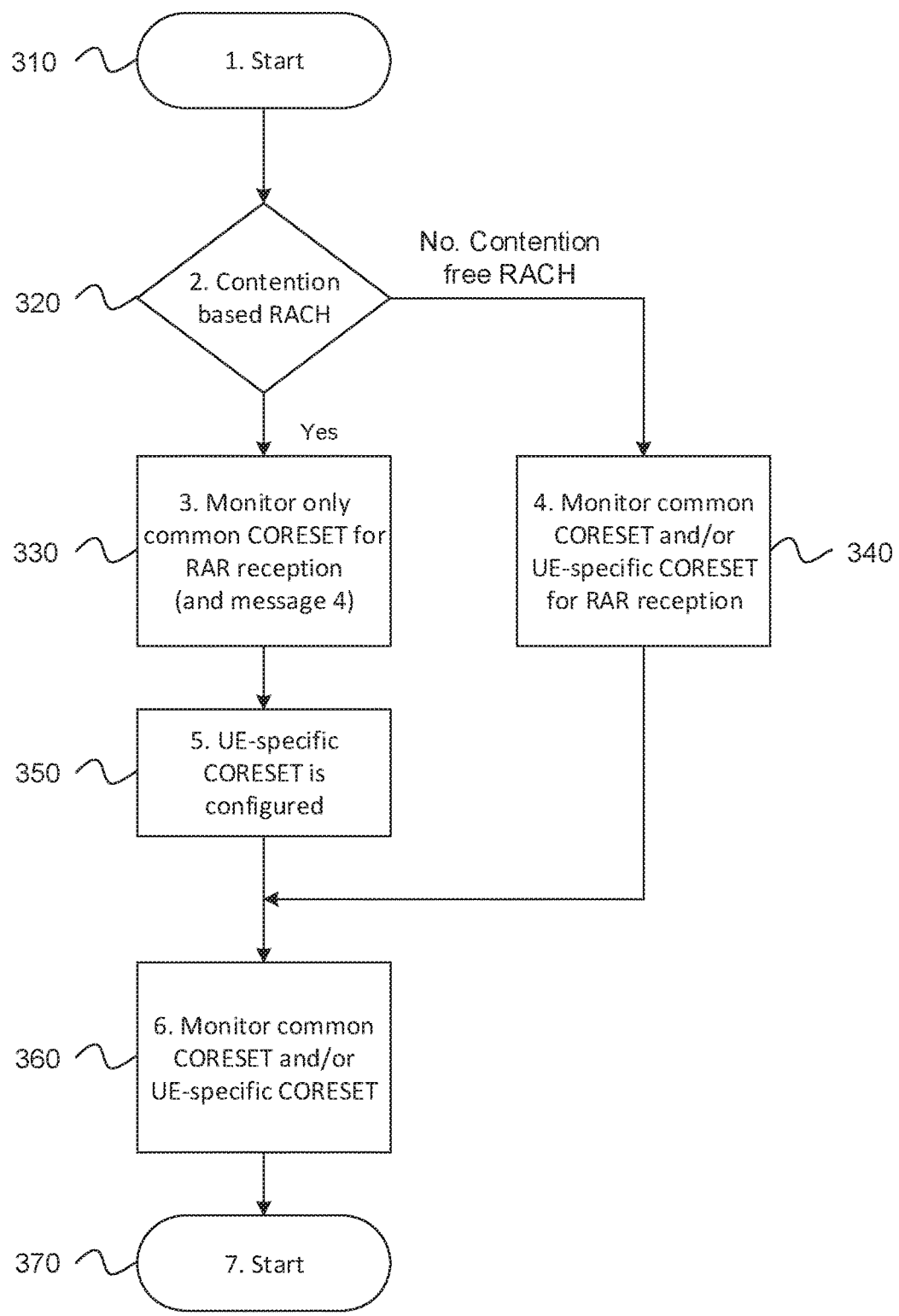
FIG. 3 illustrates UE behavior for the reception of random access response, in accordance with an example.

FIG. 3 illustrates UE behavior for the reception of a random access response, such as message 2 in FIG. 2. FIG. 3 illustrates the corresponding UE behavior for the reception of RAR messages as described above in the previous embodiments. In this example, it is also possible that more than one UE-specific CORESET can be configured for a single UE. In this case, the UE can be configured to monitor one common CORESET and more than one UE-specific CORESET for the reception of the RAR in the case of a contention-free random access. It is also possible that a UE-specific ID or cell radio network temporary identifier (C-RNTI) can be used instead of the RACH preamble ID (RA-RNTI) for the control channel masking for the RAR transmission in the case when one or more UE-specific CORESETs are used.

In another embodiment of the invention, we can have additional UE behavior on the RAR reception in the case of a handover procedure. In a handover procedure, it is possible, but not necessary, that a source cell, such as a gNB, may configure the UE-specific CORESET of the target cell, such as a different gNB, for the UE. If the UE-specific CORESET is configured before the handover procedure, the UE can utilize both common CORESET and UE-specific CORESET for the reception of RAR messages when the UE performs the random access procedure. If the UE-specific CORESET is not configured before the handover procedure, the UE has to utilize only the common CORESET for the reception of RAR messages when the UE performs the random access procedure. So, depending on the coordination between source cell and target cell, the UE-specific CORESET can be configured or not configured, where monitoring CORESETs could be different between the two cases. If a UE-specific CORESET is used for the transmission of the PDCCH for a RAR, then a UE-specific ID (e.g., a C-RNTI) can be used for the CRC masking.

In another embodiment of the invention, the UE-specific CORESET can be changed by an RRC reconfiguration even after the UE-specific CORESET is already configured. In this case, it can take some time for the reconfiguration of the UE-specific CORESET, so the UE may not know which UE-specific CORESET has to be monitored between the original UE-specific CORESET and a new UE-specific CORESET during the reconfiguration. In this case, the eNB may use the common CORESET for the scheduling for the UE since the common CORESET does not change during the reconfiguration and it is monitored by the UE during the handover procedure.

In one embodiment, the gNB behavior can be applied to the transmission of RAR. In this case, a duration (duration X) can be defined, wherein the gNB is configured to avoid scheduling for the UE using the UE-specific CORESET. The duration X can be fixed in the specification, configured by a higher layer signaling, or up to gNB implementation.

From the UE side, when a radio resource control (RRC) reconfiguration is finished, the UE can change its UE-specific CORESET to monitor the new UE-specific CORESET configured by the RRC reconfiguration. In one example, the change in the UE-specific CORESET can be performed as soon as possible once the RRC reconfiguration is completed. Alternatively, the UE can change the UE-specific CORESET after a certain duration (duration Y) after the RRC reconfiguration is completed. The duration Y can be fixed in the specification, configured by higher layer signaling, or up to gNB implementation. The UE may skip monitoring both the old UE-specific CORESET and new UE-specific CORESET during the duration Y. For example, the UE can monitor the old UE-specific CORESET during the duration Y. In one example, the duration X and the duration Y can be the same period of time or set to different periods of time.

In another embodiment of the invention, the UE can utilize the common CORESET for the reception of message 2, message 4, and in some instances for the transmission of message 3 in the random access procedure. Before the UE-specific CORESET is configured, the UE cannot monitor any PDCCH in the UE-specific CORESET. The UE can only monitor the PDCCH in the common CORESET. Since the UE is capable of configuring and supporting a fixed number of blind decodings for the PDCCH, it can monitor a higher number of PDCCH blind decodings in the common CORESET before the UE-specific CORESET is configured compared to the case when the UE-specific CORESET is configured. Therefore, as shown in FIG. 4, for the reception of a random access response (message 2) or message 4, or for the transmission of message 3, the UE can monitor only the common CORESET and this common CORESET (CORESET A) can be different from the common CORESET (CORESET B) that the UE is configured to monitor after the UE-specific CORESET if configured.

Figure 4:
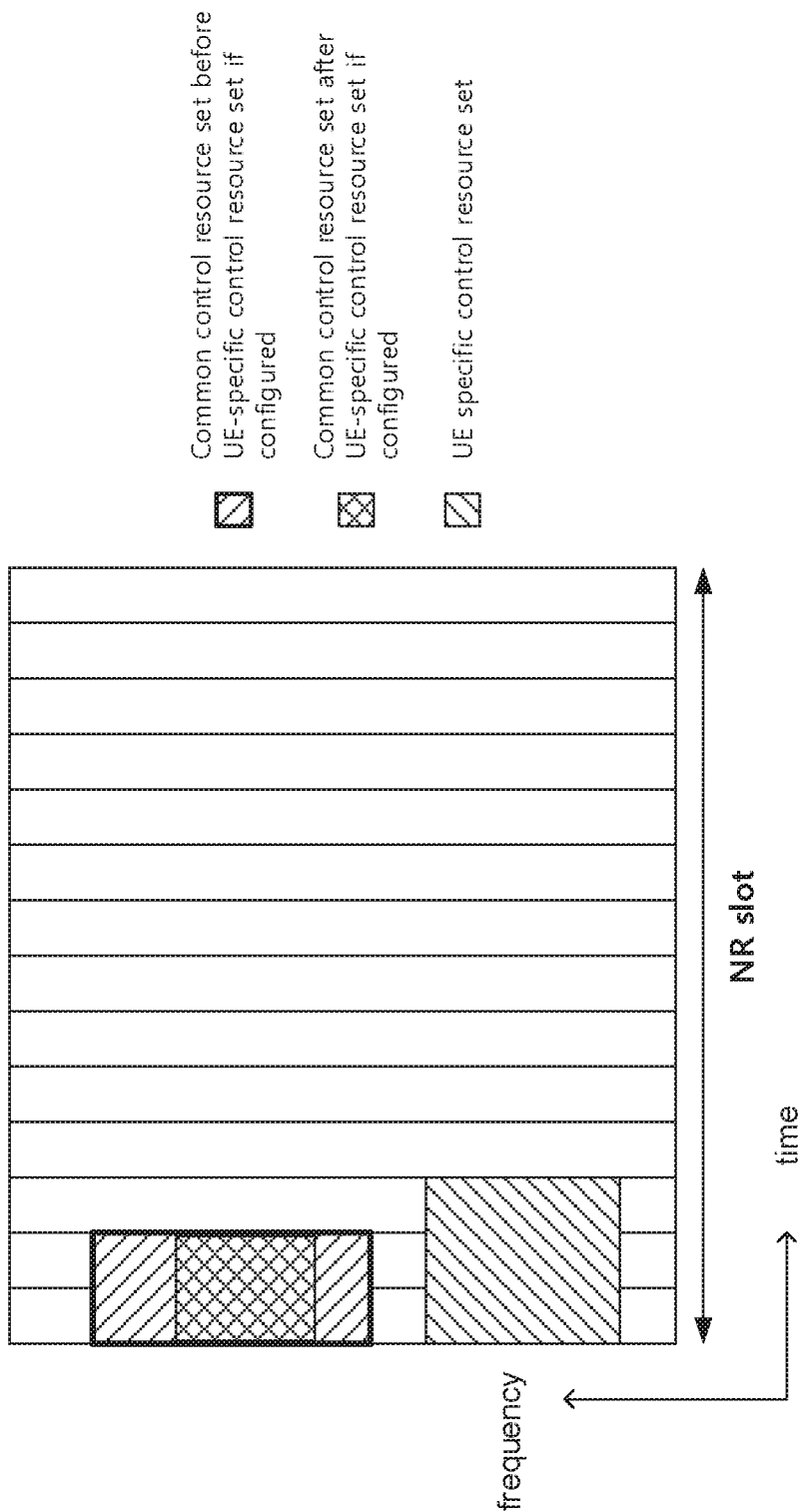
FIG. 4 illustrates different size variations between a common CORESET and a UE specific CORESET, in accordance with an example.

FIG. 4 illustrates different size variations between a common CORESET and a UE specific CORESET. FIG. 4 shows that if the UE has a UE-specific CORESET configured, the common CORESET (CORESET B) can be a subset of the common CORESET (CORESET A) when the UE-specific COREST is not configured. By having common CORESET B as a subset of common CORESET A, the number of blind decoding for the common CORESET is different between the cases when UE-specific CORESET is configured and when it is not configured.

One simple example is that if the total number of blind decoding per UE is 'M', then UE can use this 'M' number of blind decoding only for common CORESET (CORESET A) if the UE-specific CORESET is not configured. After the UE-specific CORESET is configured, the UE can use 'K' number of blind decodings for common CORESET (CORESET B), where 'K' is smaller than 'M'. The UE can use 'M-K' number of blind decodings for the UE-specific CORESET.

FIG. 4 illustrates an example in which that common CORESET size is different between the cases when UE-specific CORESET is configured and when it is not configured, i.e., CORESET A is different form CORESET B. But it is also possible that only the number of blind decoding is different between the cases when the UE-specific CORESET is configured and when the UE-specific CORESET is not configured. For example, the blind decodings can be different by defining different search spaces while keeping the actual resources of the common CORESET, i.e., CORESET A is same as CORESET B. In the random access procedure, if it is assumed that the UE-specific CORESET is configured through message 4, then for the reception of message 2, message 4, and possibly for the transmission of message 3, the UE can monitor 'M' number of blind decodings in the PDCCH inside the common CORESET A. After that, the UE-specific CORESET can be configured and the UE can monitors 'K' number of blind decodings in the PDCCH inside the common CORESET B.

Figure 5:
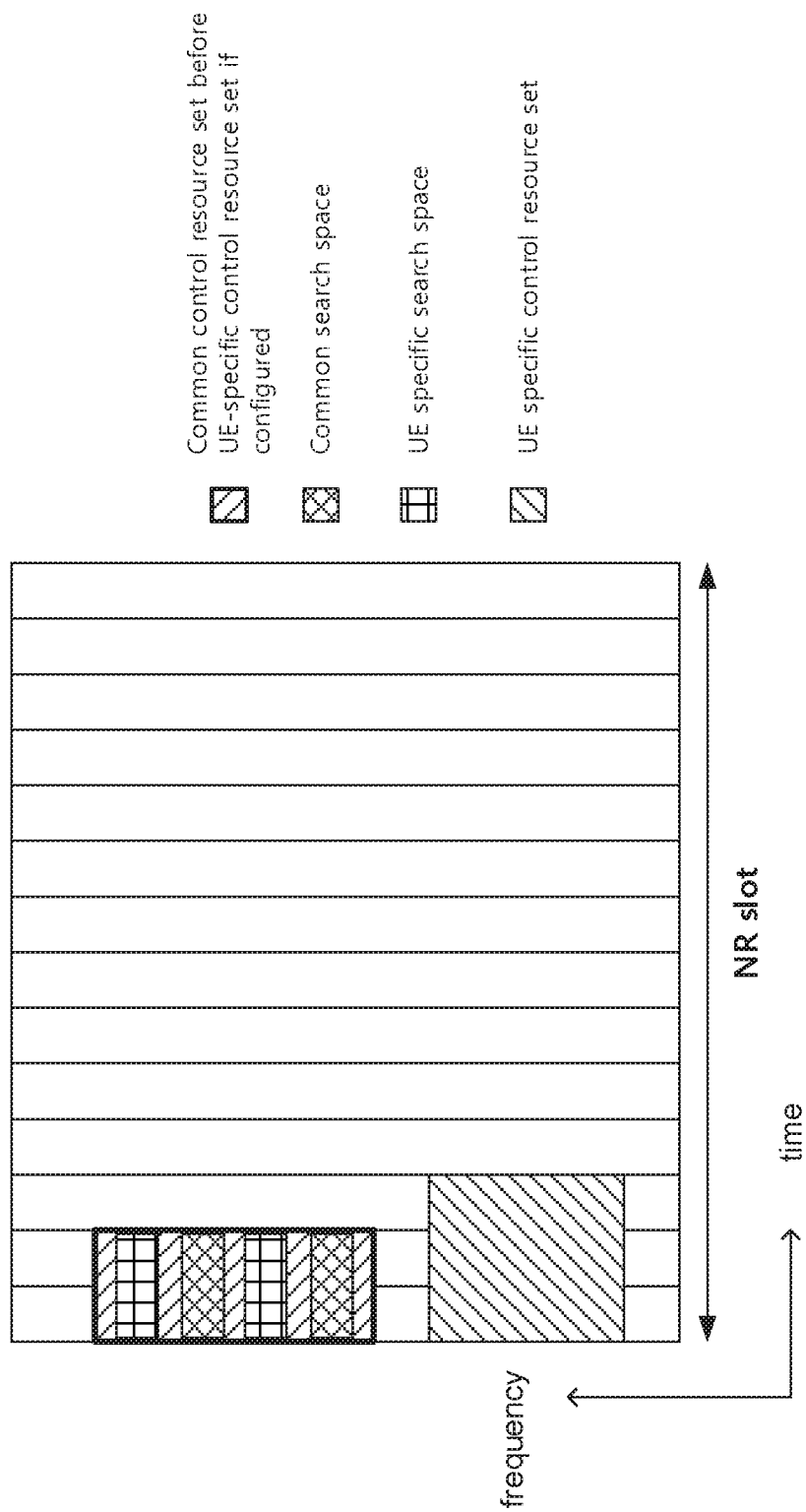
FIG. 5 illustrates search space in a common CORESET, in accordance with an example.

FIG. 5 illustrates a search space in a common CORESET. In another embodiment of the invention, it is possible to define a common search space and a UE-specific search space inside the common CORESET, as shown in FIG. 5. A common search space can consist of candidate PDCCHs which are not derived from the UE ID. While the UE-specific search space can consist of candidate PDCCHs which are derived from the UE ID.

During a RACH procedure for initial access, a common CORESET can be defined in advance. However, the UE-specific CORESET is typically not defined prior to the RACH procedure. Accordingly, the UE can use the common CORESET for the reception of PDCCH for messages 2, 3, and/or 4. In message 2, the UE ID can be allocated by the gNB. The UE, which receives message 2 (MSG2), can utilize the UE-ID for the reception of PDCCH thereafter in a UE-specific search space. Since there is a common search space separate from the UE-specific search space, the UE can use the common search space for the reception of PDCCHs for message 2 and the UE can use the UE-specific search space for the reception of PDCCHs for message 3 and message 4 and following PDCCHs as well.

It is also possible that an additional UE-specific CORESET can be configured for a UE either using message 3 or 4 or thereafter. Once the UE-specific CORESET is configured, the UE-specific search space in the common CORESET may not be required. Therefore, by skipping monitoring the UE-specific search space in the common CORESET, the UE can increase the number of monitoring PDCCH candidates in the UE-specific CORESET, assuming that the maximum number of monitoring PDCCH candidates are fixed for a UE. It is also possible that the number of monitoring PDCCH candidates for the UE-specific search space can be decreased if the additional UE-specific CORESET is configured.

In another embodiment of the invention, the UE can utilize the common CORESET for the reception of message 2, message 4, and possibly for the retransmission of message 3 in the random access procedure. Before the UE-specific CORESET is configured, the UE cannot monitor any PDCCH candidate in the UE-specific CORESET and it can only monitor the PDCCH candidates in the common CORESET. In message 2, the UE ID can be allocated by gNB and the UE, which receives message 2, can utilize the UE-ID for the reception of PDCCH candidates thereafter. It is also possible that message-2 can include the information on the UE-specific CORESET. In this case, from message 3 or message 4, the UE can use the UE-specific CORESET for the reception of PDCCH.

Figure 6:
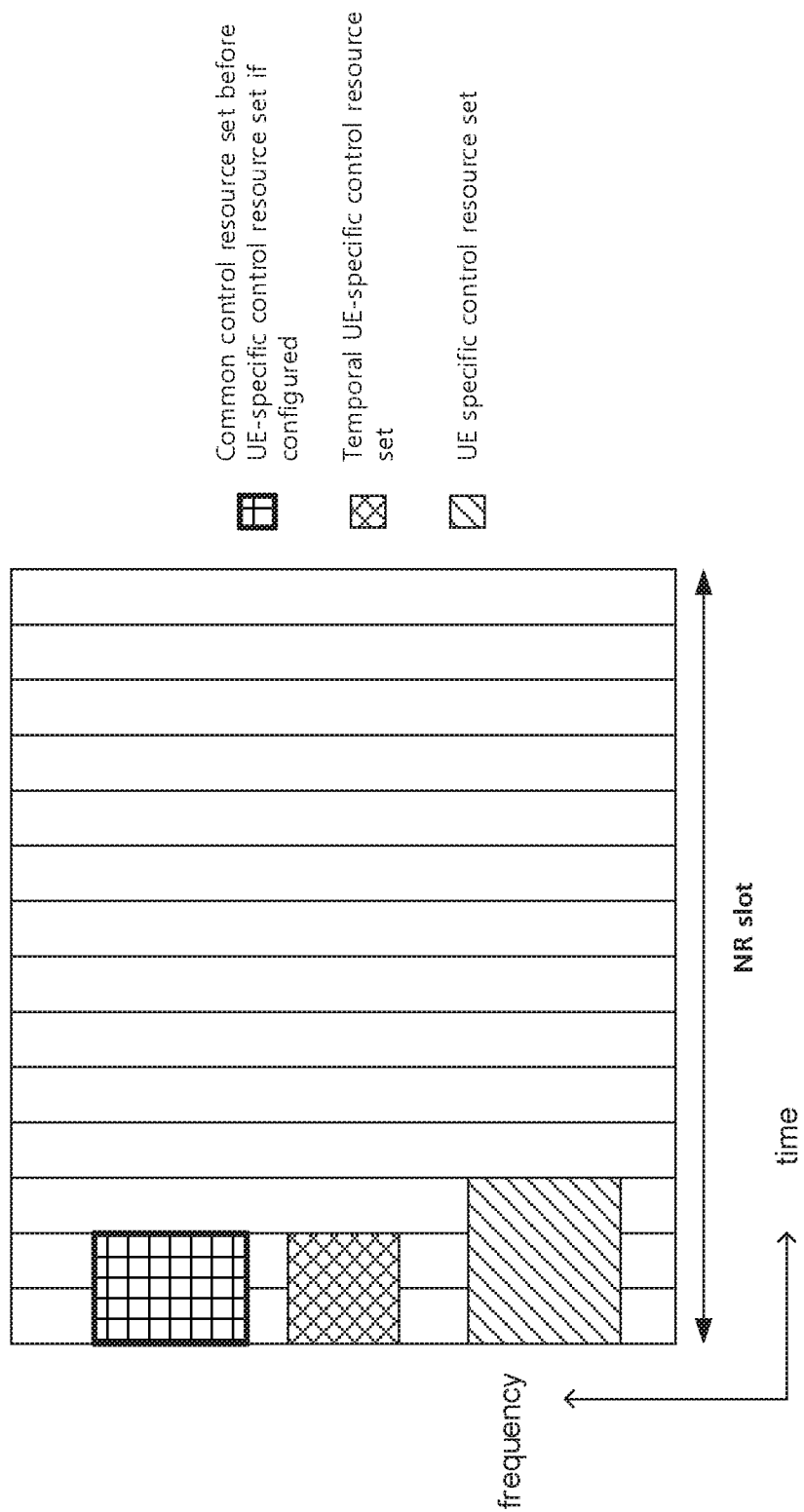
FIG. 6 illustrates a temporal UE-specific CORESET approach, in accordance with an example.

FIG. 6 illustrates a temporal UE-specific CORESET approach. In addition to the above embodiments, it is also possible that the UE-specific CORESET configured by the RACH in message 2 is a temporal UE-specific CORESET, as shown in FIG. 6. This can be used as the UE-specific CORESET until the final UE-specific CORESET is configured. When the UE-specific CORESET is configured, the temporal UE-specific CORESET may not be used anymore for that UE.

Figure 7:
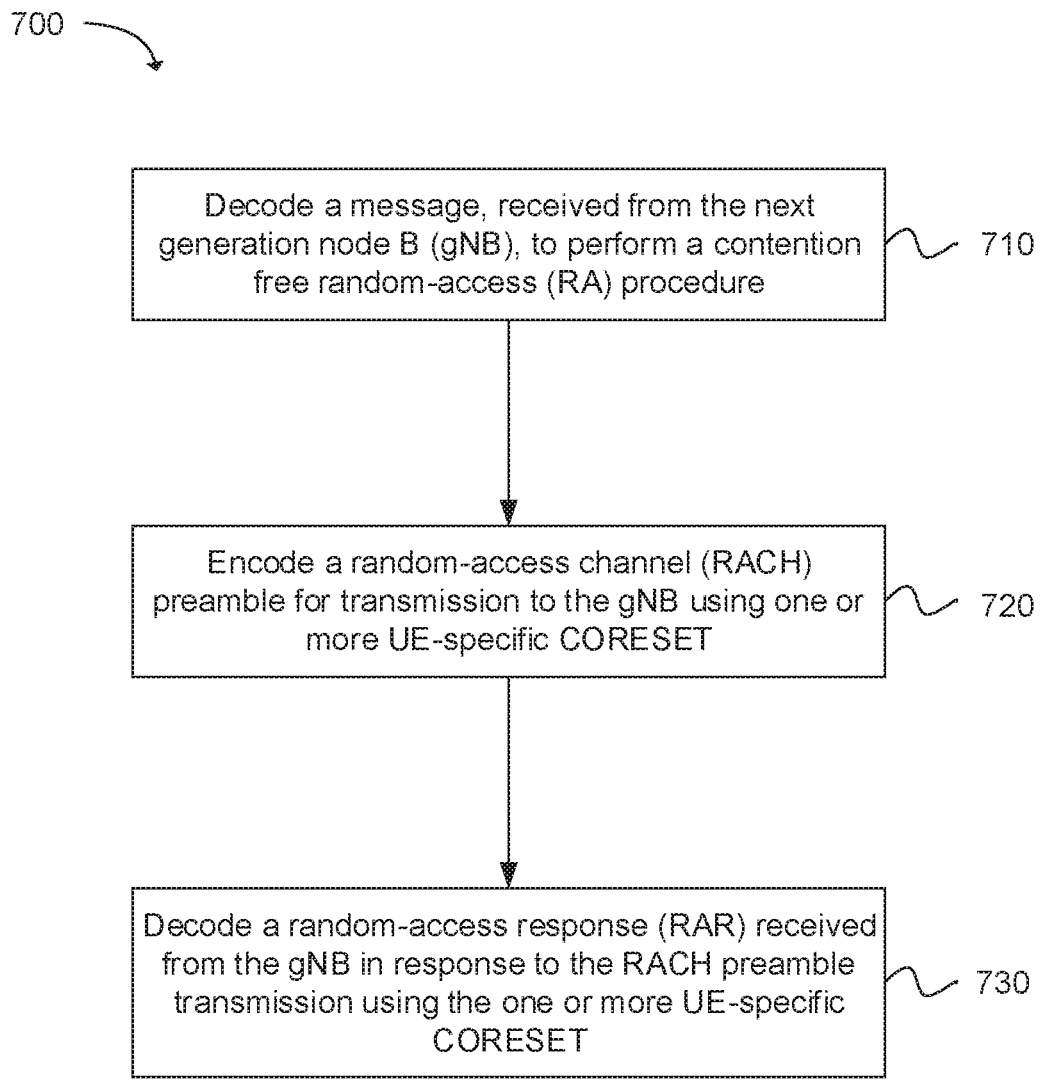
FIG. 7 depicts functionality of a user equipment (UE), operable to perform a random-access procedure using a UE-specific control resource set (CORESET), in accordance with an example.

FIG. 7 depicts functionality 700 of a user equipment (UE), operable to perform a random-access procedure using a UE-specific control resource set (CORESET). The UE can comprise of one or more processors configured to decode a message, received from the next generation node B (gNB), to perform a contention free random-access (RA) procedure 710. The UE can comprise of one or more processors configured to encode a random-access channel (RACH) preamble for transmission to the gNB using one or more UE-specific CORESET 720. The UE can comprise of one or more processors configured to decode a random-access response (RAR) received from the gNB in response to the RACH preamble transmission using the one or more UE-specific CORESET 730.

In one embodiment, the one or more processors are further configured to encode the RACH preamble using a cell radio network temporary identifier (C-RNTI) for transmission to the gNB.

In one embodiment, the one or more processors are further configured to decode the RAR using a cell radio network temporary identifier (C-RNTI).

In one embodiment, the one or more processors are further configured to encode the RACH preamble using a cell radio network temporary identifier (C-RNTI) for transmission to the gNB, wherein the one or more UE-specific CORESET is comprised of a predetermined set of resource element groups (REGs).

In one embodiment, the one or more processors are further configured to monitor a common CORESET for reception of the RAR, wherein the RAR of the common CORESET is configured to be decoded using a random access radio network temporary identifier (RA-RNTI).

In one embodiment, the one or more processors are further configured to encode a random access procedure message 3 for transmission to the gNB using a cell radio network temporary identifier (C-RNTI); and decode a random access procedure message 4 received from the gNB using a C-RNTI.

In one embodiment, the one or more processors are further configured to decode a radio resource control (RRC) reconfiguration message, received from the gNB, identifying a second UE-specific CORESET for the UE; monitor a common CORESET at the UE, for scheduling, for a predetermined time period after the RRC reconfiguration message is received; and monitor the second UE-specific CORESET after the predetermined time period.

In one embodiment, the predetermined time period is predetermined in a specification, configured by higher layer signaling, or based on a specific implementation of a gNB.

Figure 8:
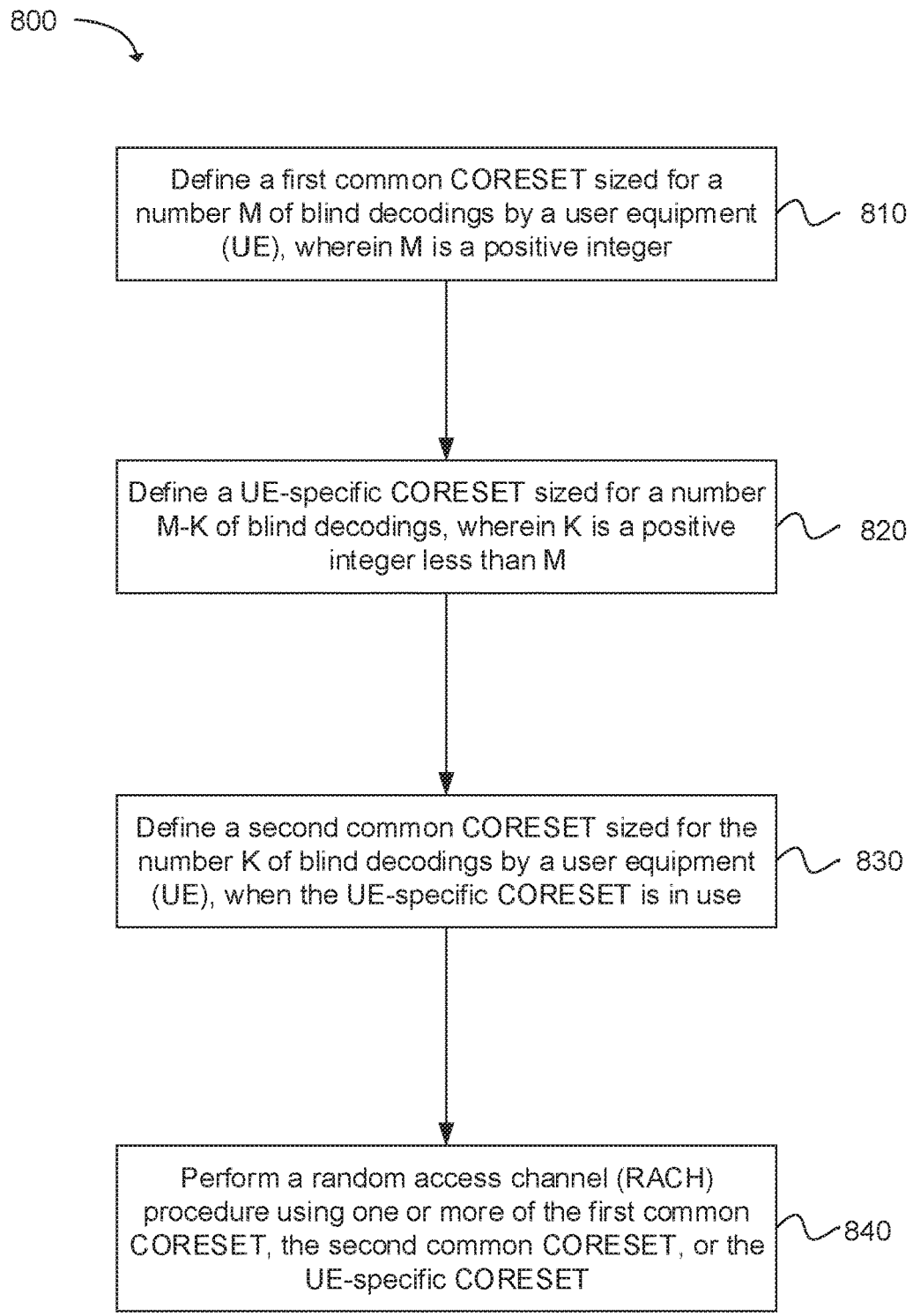
FIG. 8 depicts functionality of a next generation node B (gNB), operable to perform a random-access procedure using a plurality of control resource sets (CORESETs), in accordance with an example.

FIG. 8 depicts functionality 800 of a next generation node B (gNB), operable to perform a random-access procedure using a plurality of control resource sets (CORESETs). The gNB can comprise of one or more processors configured to define a first common CORESET sized for a number M of blind decodings by a user equipment (UE), wherein M is a positive integer 810. The gNB can comprise of one or more processors configured to define a UE-specific CORESET sized for a number M−K of blind decodings, wherein K is a positive integer less than M 820. The gNB can comprise of one or more processors configured to define a second common CORESET sized for the number K of blind decodings by a user equipment (UE), when the UE-specific CORESET is in use 830. The gNB can comprise of one or more processors configured to perform a random access channel (RACH) procedure using one or more of the first common CORESET, the second common CORESET, or the UE-specific CORESET 840.

In one embodiment, the one or more processors are further configured to decode a random-access channel (RACH) preamble transmission received from a UE; and encode a random access response (RAR) message using the first common CORESET.

In one embodiment, the one or more processors are further configured to encode a message for transmission to the UE, to perform a contention free random-access (RA) procedure; decode a random-access channel (RACH) preamble received from the UE using the UE-specific CORESET sized for the number M−K of blind decodings; and encode a random-access response (RAR) for transmission to the gNB in response to the RACH preamble transmission using the UE-specific CORESET; and monitor the second common CORESET sized for the number K of blind decodings.

Figure 9:
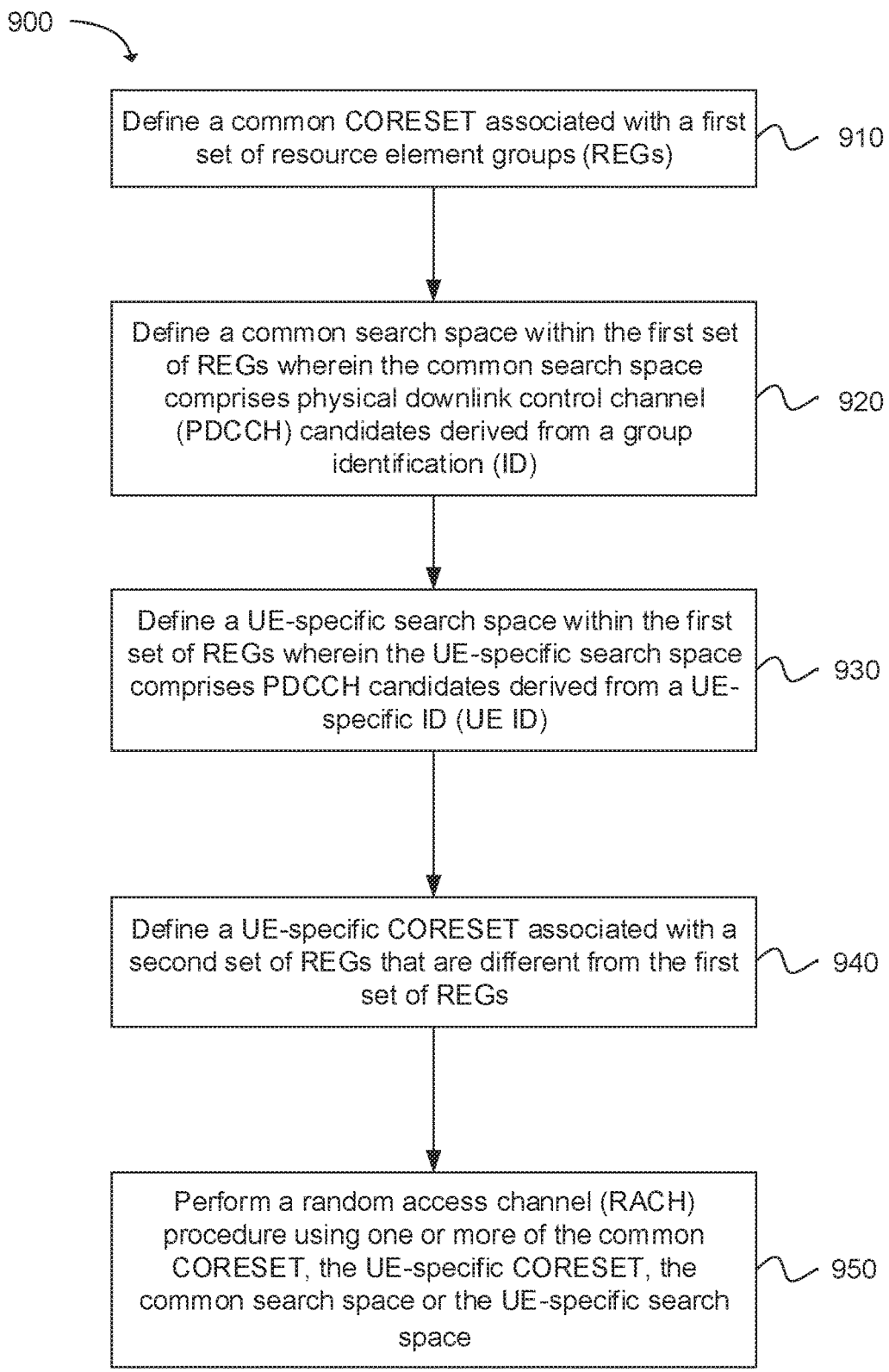
FIG. 9 depicts functionality of a next generation node B (gNB), operable to perform a random-access procedure using a plurality of control resource sets (CORESETs), in accordance with an example.

FIG. 9 depicts functionality 900 of a next generation node B (gNB), operable to perform a random-access procedure using a plurality of control resource sets (CORESETs). The gNB can comprise of one or more processors configured to define a common CORESET associated with a first set of resource element groups (REGs) 910. The gNB can comprise of one or more processors configured to define a common search space within the first set of REGs wherein the common search space comprises physical downlink control channel (PDCCH) candidates derived from a group identification (ID) 920. The gNB can comprise of one or more processors configured to define a UE-specific search space within the first set of REGs wherein the UE-specific search space comprises PDCCH candidates derived from a UE-specific ID (UE ID) 930. The gNB can comprise of one or more processors configured to define a UE-specific CORESET associated with a second set of REGs that are different from the first set of REGs 940. The gNB can comprise of one or more processors configured to perform a random access channel (RACH) procedure using one or more of the common CORESET, the UE-specific CORESET, the common search space or the UE-specific search space 950.

In one embodiment, the one or more processors are further configured to decode a RACH preamble using a cell radio network temporary identifier (C-RNTI) to be received by the gNB.

In one embodiment, the one or more processors are further configured to encode a random access response (RAR) using a cell radio network temporary identifier (C-RNTI).

In one embodiment, the one or more processors are further configured to encode a random access procedure message 2 for transmission to a user equipment (UE) using the PDCCH candidates of the UE ID; encode a random access procedure message 3 for transmission to the UE using the PDCCH candidates of the UE ID; and decode a random access procedure message 4 for reception from the UE using the PDCCH candidates of the UE ID.

In one embodiment, the one or more processors are further configured to encode a radio resource control (RRC) reconfiguration message, identifying the second UE-specific CORESET for the UE which is different from the first UE-specific CORESET; schedule, using the common CORESET at the gNB, control channel and shared channel information, for a predetermined time period after the RRC reconfiguration message is received; and schedule the control channel and shared channel information using the second UE-specific CORESET after the predetermined time period.

In one embodiment, the predetermined time period is predetermined in a specification, configured by higher layer signaling, or based on a specific implementation of the gNB.

Figure 10:
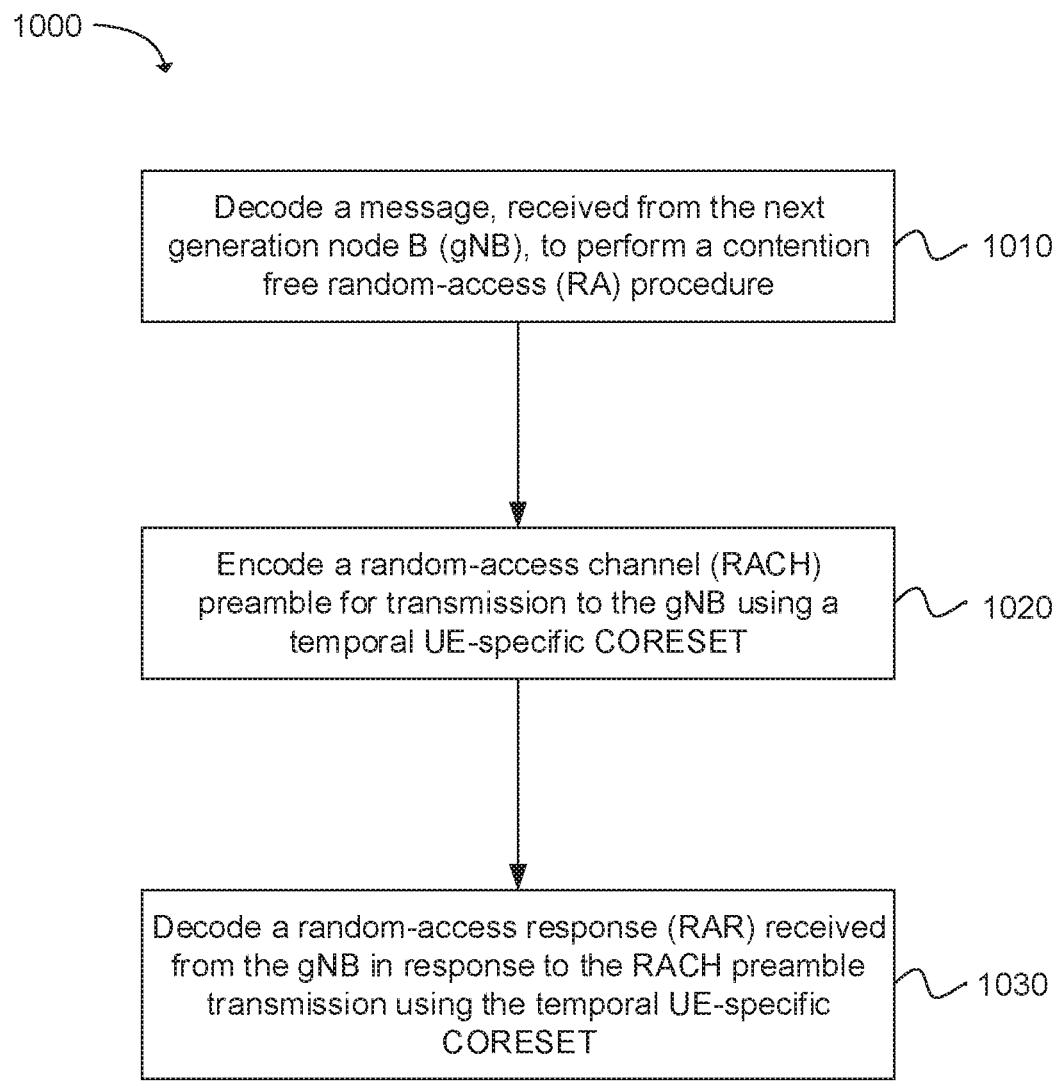
FIG. 10 depicts functionality of a user equipment (UE), operable to perform a random-access procedure using a UE-specific control resource set (CORESET), in accordance with an example.

FIG. 10 depicts functionality 1000 of a user equipment (UE), operable to perform a random-access procedure using a UE-specific control resource set (CORESET). The gNB can comprise of one or more processors configured to decode a message, received from the next generation node B (gNB), to perform a contention free random-access (RA) procedure 1010. The gNB can comprise of one or more processors configured to encode a random-access channel (RACH) preamble for transmission to the gNB using a temporal UE-specific CORESET 1020. The gNB can comprise of one or more processors configured to decode a random-access response (RAR) received from the gNB in response to the RACH preamble transmission using the temporal UE-specific CORESET 1030.

In one embodiment, the one or more processors are further configured to monitor the temporal UE-specific CORESET for a predetermined time period; and monitor a non-temporal UE-specific CORESET after the predetermined time period.

In one embodiment, the one or more processors are further configured to decode a random access procedure message 2 using the common CORESET to identify information for the non-temporal UE-specific CORESET; and decode a message 3 or a message 4 using the non-temporal UE-specific CORESET.

Figure 11:
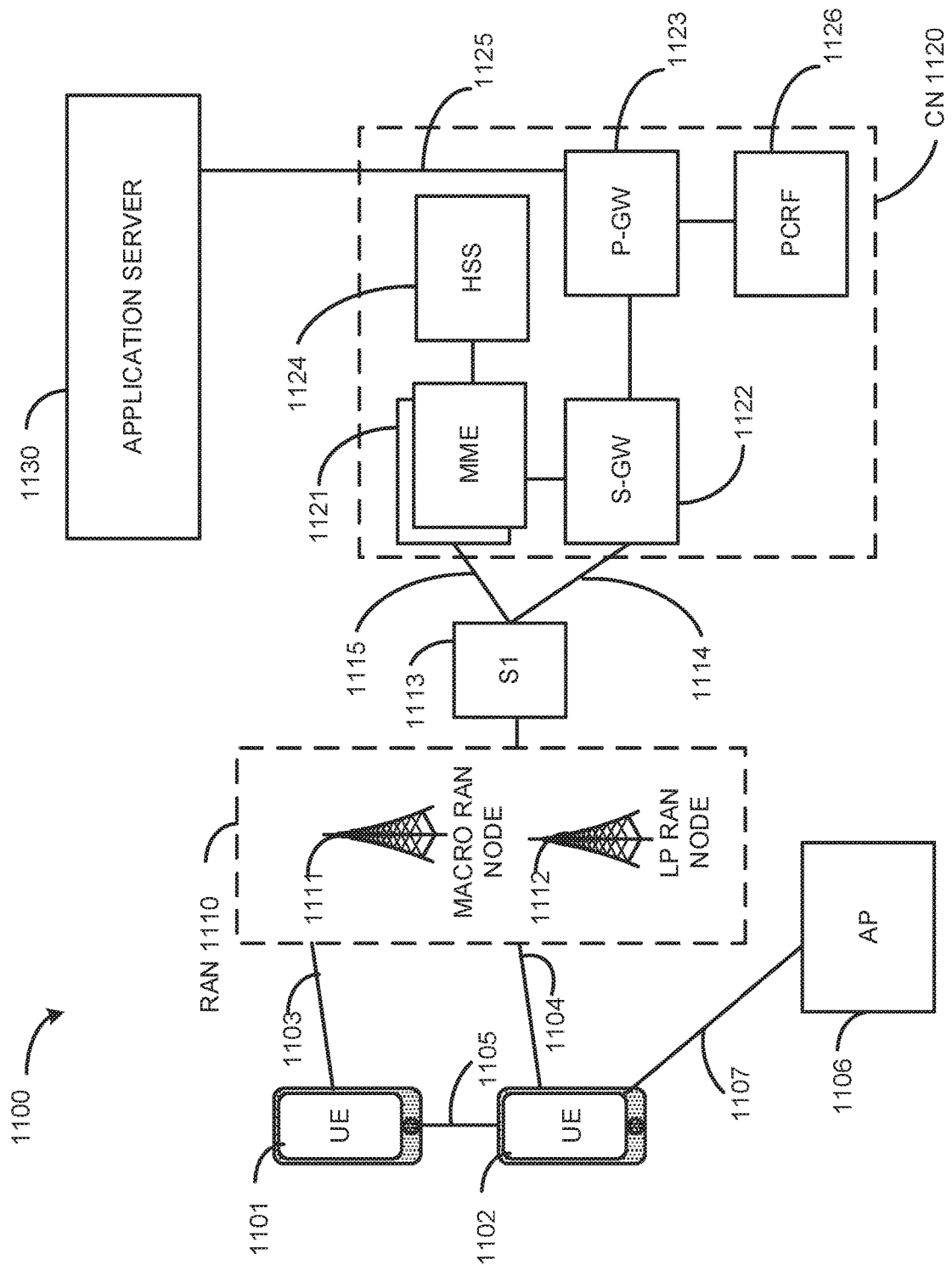
FIG. 11 illustrates an architecture of a network, in accordance with an example.

FIG. 11 illustrates architecture of a system 1100 of a network in accordance with some embodiments. The system 1100 is shown to include a user equipment (UE) 1101 and a UE 1102. The UEs 1101 and 1102 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 1101 and 1102 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 1101 and 1102 may be configured to connect, e.g., communicatively couple, with a radio access network (RAN) 1110—the RAN 1110 may be, for example, an Evolved Universal Mobile Telecommunications System (UMTS) Terrestrial Radio Access Network (E-UTRAN), a Ne8Gen RAN (NG RAN), or some other type of RAN. The UEs 1101 and 1102 utilize connections 1103 and 1104, respectively, each of which comprises a physical communications interface or layer (discussed in further detail below); in this example, the connections 1103 and 1104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 1101 and 1102 may further directly exchange communication data via a ProSe interface 1105. The ProSe interface 1105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1102 is shown to be configured to access an access point (AP) 1106 via connection 1107. The connection 1107 can comprise a local wireless connection, such as a connection consistent with any IEEE 802.11 protocol, wherein the AP 1106 would comprise a wireless fidelity (WiFi®) router. In this example, the AP 1106 is shown to be connected to the Internet without connecting to the core network of the wireless system (described in further detail below).

The RAN 1110 can include one or more access nodes that enable the connections 1103 and 1104. These access nodes (ANs) can be referred to as base stations (BSs), NodeBs, evolved NodeBs (eNBs), ne8 Generation NodeBs (gNB), RAN nodes, and so forth, and can comprise ground stations (e.g., terrestrial access points) or satellite stations providing coverage within a geographic area (e.g., a cell). The RAN 1110 may include one or more RAN nodes for providing macrocells, e.g., macro RAN node 1111, and one or more RAN nodes for providing femtocells or picocells (e.g., cells having smaller coverage areas, smaller user capacity, or higher bandwidth compared to macrocells), e.g., low power (LP) RAN node 1112.

Any of the RAN nodes 1111 and 1112 can terminate the air interface protocol and can be the first point of contact for the UEs 1101 and 1102. In some embodiments, any of the RAN nodes 1111 and 1112 can fulfill various logical functions for the RAN 1110 including, but not limited to, radio network controller (RNC) functions such as radio bearer management, uplink and downlink dynamic radio resource management and data packet scheduling, and mobility management.

In accordance with some embodiments, the UEs 1101 and 1102 can be configured to communicate using Orthogonal Frequency-Division Multiplexing (OFDM) communication signals with each other or with any of the RAN nodes 1111 and 1112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 1111 and 1112 to the UEs 1101 and 1102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 1101 and 1102. The physical downlink control channel (PDCCH) may carry information about the transport format and resource allocations related to the PDSCH channel, among other things. It may also inform the UEs 1101 and 1102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 1111 and 1112 based on channel quality information fed back from any of the UEs 1101 and 1102. The downlink resource assignment information may be sent on the PDCCH used for (e.g., assigned to) each of the UEs 1101 and 1102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an e8ension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 1110 is shown to be communicatively coupled to a core network (CN) 1120—via an S1 interface 1113. In embodiments, the CN 1120 may be an evolved packet core (EPC) network, a Ne8Gen Packet Core (NPC) network, or some other type of CN. In this embodiment the S1 interface 1113 is split into two parts: the S1-U interface 1114, which carries traffic data between the RAN nodes 1111 and 1112 and the serving gateway (S-GW) 1122, and the S1-mobility management entity (MME) interface 1115, which is a signaling interface between the RAN nodes 1111 and 1112 and MMEs 1121.

In this embodiment, the CN 1120 comprises the MMEs 1121, the S-GW 1122, the Packet Data Network (PDN) Gateway (P-GW) 1123, and a home subscriber server (HSS) 1124. The MMEs 1121 may be similar in function to the control plane of legacy Serving General Packet Radio Service (GPRS) Support Nodes (SGSN). The MMEs 1121 may manage mobility aspects in access such as gateway selection and tracking area list management. The HSS 1124 may comprise a database for network users, including subscription-related information to support the network entities' handling of communication sessions. The CN 1120 may comprise one or several HSSs 1124, depending on the number of mobile subscribers, on the capacity of the equipment, on the organization of the network, etc. For example, the HSS 1124 can provide support for routing/roaming, authentication, authorization, naming/addressing resolution, location dependencies, etc.

The S-GW 1122 may terminate the S1 interface 1113 towards the RAN 1110, and routes data packets between the RAN 1110 and the CN 1120. In addition, the S-GW 1122 may be a local mobility anchor point for inter-RAN node handovers and also may provide an anchor for inter-3GPP mobility. Other responsibilities may include lawful intercept, charging, and some policy enforcement.

The P-GW 1123 may terminate an SGi interface toward a PDN. The P-GW 1123 may route data packets between the EPC network 1123 and e8ernal networks such as a network including the application server 1130 (alternatively referred to as application function (AF)) via an Internet Protocol (IP) interface 1125. Generally, the application server 1130 may be an element offering applications that use IP bearer resources with the core network (e.g., UMTS Packet Services (PS) domain, LTE PS data services, etc.). In this embodiment, the P-GW 1123 is shown to be communicatively coupled to an application server 1130 via an IP communications interface 1125. The application server 1130 can also be configured to support one or more communication services (e.g., Voice-over-Internet Protocol (VoIP) sessions, PTT sessions, group communication sessions, social networking services, etc.) for the UEs 1101 and 1102 via the CN 1120.

The P-GW 1123 may further be a node for policy enforcement and charging data collection. Policy and Charging Enforcement Function (PCRF) 1126 is the policy and charging control element of the CN 1120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1126 may be communicatively coupled to the application server 1130 via the P-GW 1123. The application server 1130 may signal the PCRF 1126 to indicate a new service flow and select the appropriate Quality of Service (QoS) and charging parameters. The PCRF 1126 may provision this rule into a Policy and Charging Enforcement Function (PCEF) (not shown) with the appropriate traffic flow template (TFT) and QoS class of identifier (QCI), which commences the QoS and charging as specified by the application server 1130.

Figure 12:
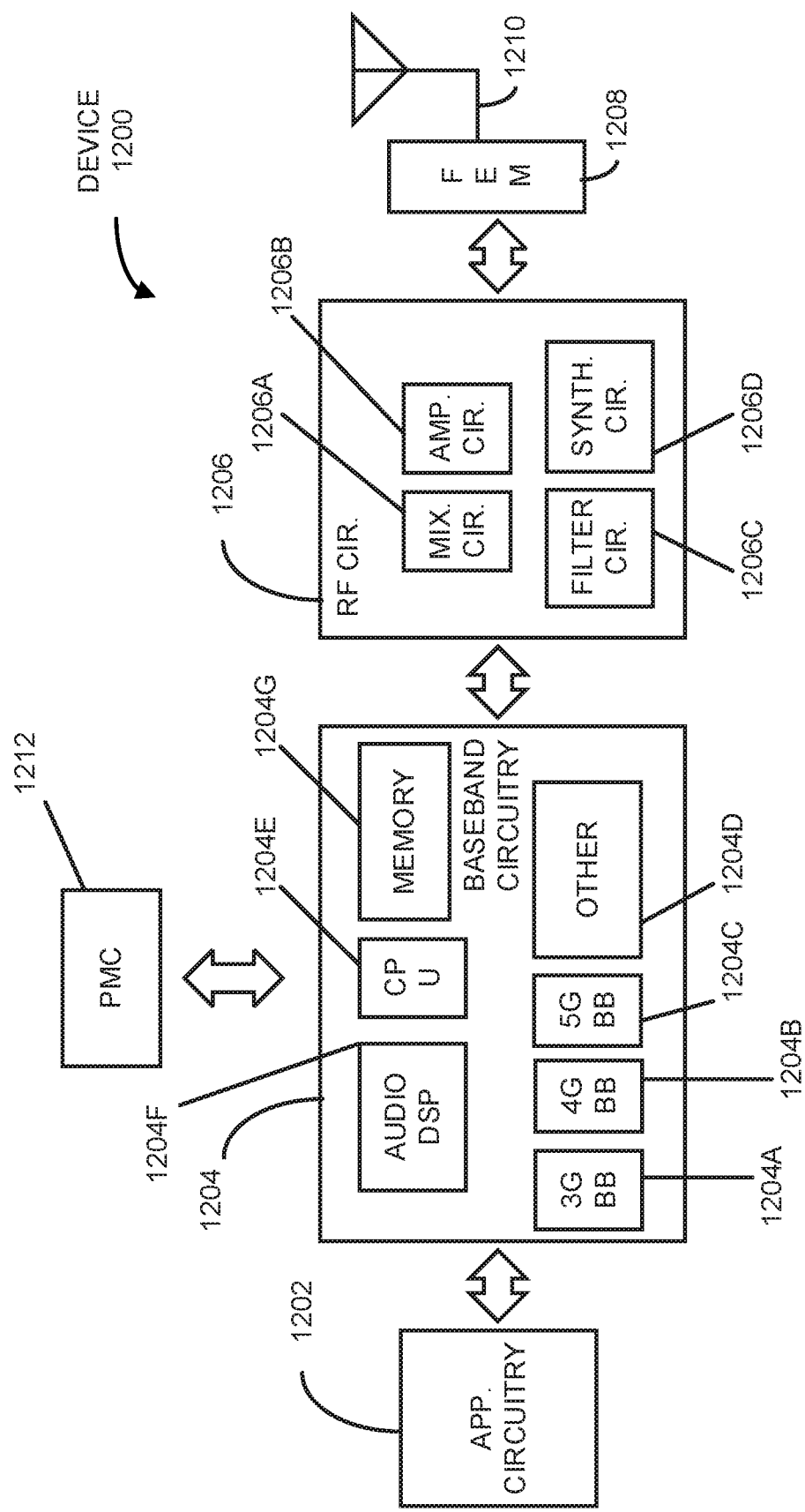
FIG. 12 illustrates a diagram of a wireless device (e.g., UE) and a base station (e.g., eNodeB) in accordance with an example.

FIG. 12 illustrates example components of a device 1200 in accordance with some embodiments. In some embodiments, the device 1200 may include application circuitry 1202, baseband circuitry 1204, Radio Frequency (RF) circuitry 1206, front-end module (FEM) circuitry 1208, one or more antennas 1210, and power management circuitry (PMC) 1212 coupled together at least as shown. The components of the illustrated device 1200 may be included in a UE or a RAN node. In some embodiments, the device 1200 may include less elements (e.g., a RAN node may not utilize application circuitry 1202, and instead include a processor/controller to process IP data received from an EPC). In some embodiments, the device 1200 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1202 may include one or more application processors. For example, the application circuitry 1202 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1200. In some embodiments, processors of application circuitry 1202 may process IP data packets received from an EPC.

The baseband circuitry 1204 may include circuitry such as, but not limited to, one or more single-core or multi-core processors. The baseband circuitry 1204 may include one or more baseband processors or control logic to process baseband signals received from a receive signal path of the RF circuitry 1206 and to generate baseband signals for a transmit signal path of the RF circuitry 1206. Baseband processing circuity 1204 may interface with the application circuitry 1202 for generation and processing of the baseband signals and for controlling operations of the RF circuitry 1206. For example, in some embodiments, the baseband circuitry 1204 may include a third generation (3G) baseband processor 1204A, a fourth generation (4G) baseband processor 1204B, a fifth generation (5G) baseband processor 1204C, or other baseband processor(s) 1204D for other existing generations, generations in development or to be developed in the future (e.g., second generation (2G), sixth generation (6G), etc.). The baseband circuitry 1204 (e.g., one or more of baseband processors 1204A-D) may handle various radio control functions that enable communication with one or more radio networks via the RF circuitry 1206. In other embodiments, some or all of the functionality of baseband processors 1204A-D may be included in modules stored in the memory 1204G and executed via a Central Processing Unit (CPU) 1204E. The radio control functions may include, but are not limited to, signal modulation/demodulation, encoding/decoding, radio frequency shifting, etc. In some embodiments, modulation/demodulation circuitry of the baseband circuitry 1204 may include Fast-Fourier Transform (FFT), precoding, or constellation mapping/demapping functionality. In some embodiments, encoding/decoding circuitry of the baseband circuitry 1204 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1204 may include one or more audio digital signal processor(s) (DSP) 1204F. The audio DSP(s) 1204F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1204 and the application circuitry 1202 may be implemented together such as, for example, on a system on a chip (SOC).

In some embodiments, the baseband circuitry 1204 may provide for communication compatible with one or more radio technologies. For example, in some embodiments, the baseband circuitry 1204 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 1204 is configured to support radio communications of more than one wireless protocol may be referred to as multi-mode baseband circuitry.

RF circuitry 1206 may enable communication with wireless networks using modulated electromagnetic radiation through a non-solid medium. In various embodiments, the RF circuitry 1206 may include switches, filters, amplifiers, etc. to facilitate the communication with the wireless network. RF circuitry 1206 may include a receive signal path which may include circuitry to down-convert RF signals received from the FEM circuitry 1208 and provide baseband signals to the baseband circuitry 1204. RF circuitry 1206 may also include a transmit signal path which may include circuitry to up-convert baseband signals provided by the baseband circuitry 1204 and provide RF output signals to the FEM circuitry 1208 for transmission.

In some embodiments, the receive signal path of the RF circuitry 1206 may include mixer circuitry 1206a, amplifier circuitry 1206b and filter circuitry 1206c. In some embodiments, the transmit signal path of the RF circuitry 1206 may include filter circuitry 1206c and mixer circuitry 1206a. RF circuitry 1206 may also include synthesizer circuitry 1206d for synthesizing a frequency for use by the mixer circuitry 1206a of the receive signal path and the transmit signal path. In some embodiments, the mixer circuitry 1206a of the receive signal path may be configured to down-convert RF signals received from the FEM circuitry 1208 based on the synthesized frequency provided by synthesizer circuitry 1206d. The amplifier circuitry 1206b may be configured to amplify the down-converted signals and the filter circuitry 1206c may be a low-pass filter (LPF) or band-pass filter (BPF) configured to remove unwanted signals from the down-converted signals to generate output baseband signals. Output baseband signals may be provided to the baseband circuitry 1204 for further processing. In some embodiments, the output baseband signals may be zero-frequency baseband signals, although this is not a necessity. In some embodiments, mixer circuitry 1206a of the receive signal path may comprise passive mixers, although the scope of the embodiments is not limited in this respect.

In some embodiments, the mixer circuitry 1206a of the transmit signal path may be configured to up-convert input baseband signals based on the synthesized frequency provided by the synthesizer circuitry 1206d to generate RF output signals for the FEM circuitry 1208. The baseband signals may be provided by the baseband circuitry 1204 and may be filtered by filter circuitry 1206c.

In some embodiments, the mixer circuitry 1206a of the receive signal path and the mixer circuitry 1206a of the transmit signal path may include two or more mixers and may be arranged for quadrature downconversion and upconversion, respectively. In some embodiments, the mixer circuitry 1206a of the receive signal path and the mixer circuitry 1206a of the transmit signal path may include two or more mixers and may be arranged for image rejection (e.g., Hartley image rejection). In some embodiments, the mixer circuitry 1206a of the receive signal path and the mixer circuitry 1206a may be arranged for direct downconversion and direct upconversion, respectively. In some embodiments, the mixer circuitry 1206a of the receive signal path and the mixer circuitry 1206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1206 may include analog-to-digital converter (ADC) and digital-to-analog converter (DAC) circuitry and the baseband circuitry 1204 may include a digital baseband interface to communicate with the RF circuitry 1206.

In some dual-mode embodiments, a separate radio IC circuitry may be provided for processing signals for each spectrum, although the scope of the embodiments is not limited in this respect.

In some embodiments, the synthesizer circuitry 1206d may be a fractional-N synthesizer or a fractional N/N+1 synthesizer, although the scope of the embodiments is not limited in this respect as other types of frequency synthesizers may be suitable. For example, synthesizer circuitry 1206d may be a delta-sigma synthesizer, a frequency multiplier, or a synthesizer comprising a phase-locked loop with a frequency divider.

The synthesizer circuitry 1206d may be configured to synthesize an output frequency for use by the mixer circuitry 1206a of the RF circuitry 1206 based on a frequency input and a divider control input. In some embodiments, the synthesizer circuitry 1206d may be a fractional N/N+1 synthesizer.

In some embodiments, frequency input may be provided by a voltage controlled oscillator (VCO), although that is not a necessity. Divider control input may be provided by either the baseband circuitry 1204 or the applications processor 1202 depending on the desired output frequency. In some embodiments, a divider control input (e.g., N) may be determined from a look-up table based on a channel indicated by the applications processor 1202.

Synthesizer circuitry 1206d of the RF circuitry 1206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1206d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1206 may include an IQ/polar converter.

FEM circuitry 1208 may include a receive signal path which may include circuitry configured to operate on RF signals received from one or more antennas 1210, amplify the received signals and provide the amplified versions of the received signals to the RF circuitry 1206 for further processing. FEM circuitry 1208 may also include a transmit signal path which may include circuitry configured to amplify signals for transmission provided by the RF circuitry 1206 for transmission by one or more of the one or more antennas 1210. In various embodiments, the amplification through the transmit or receive signal paths may be done solely in the RF circuitry 1206, solely in the FEM 1208, or in both the RF circuitry 1206 and the FEM 1208.

In some embodiments, the FEM circuitry 1208 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1206). The transmit signal path of the FEM circuitry 1208 may include a power amplifier (PA) to amplify input RF signals (e.g., provided by RF circuitry 1206), and one or more filters to generate RF signals for subsequent transmission (e.g., by one or more of the one or more antennas 1210).

In some embodiments, the PMC 1212 may manage power provided to the baseband circuitry 1204. In particular, the PMC 1212 may control power-source selection, voltage scaling, battery charging, or DC-to-DC conversion. The PMC 1212 may often be included when the device 1200 is capable of being powered by a battery, for example, when the device is included in a UE. The PMC 1212 may increase the power conversion efficiency while providing desirable implementation size and heat dissipation characteristics.

While FIG. 12 shows the PMC 1212 coupled only with the baseband circuitry 1204. However, in other embodiments, the PMC 1212 may be additionally or alternatively coupled with, and perform similar power management operations for, other components such as, but not limited to, application circuitry 802, RF circuitry 1206, or FEM 1208.

In some embodiments, the PMC 1212 may control, or otherwise be part of, various power saving mechanisms of the device 1200. For example, if the device 1200 is in an RRC_Connected state, where it is still connected to the RAN node as it expects to receive traffic shortly, then it may enter a state known as Discontinuous Reception Mode (DRX) after a period of inactivity. During this state, the device 1200 may power down for brief intervals of time and thus save power.

If there is no data traffic activity for an extended period of time, then the device 1200 may transition off to an RRC_Idle state, where it disconnects from the network and does not perform operations such as channel quality feedback, handover, etc. The device 1200 goes into a very low power state and it performs paging where again it periodically wakes up to listen to the network and then powers down again. The device 1200 may not receive data in this state, in order to receive data, it can transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1202 and processors of the baseband circuitry 1204 may be used to execute elements of one or more instances of a protocol stack. For example, processors of the baseband circuitry 1204, alone or in combination, may be used execute Layer 3, Layer 2, or Layer 1 functionality, while processors of the application circuitry 1202 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 13:
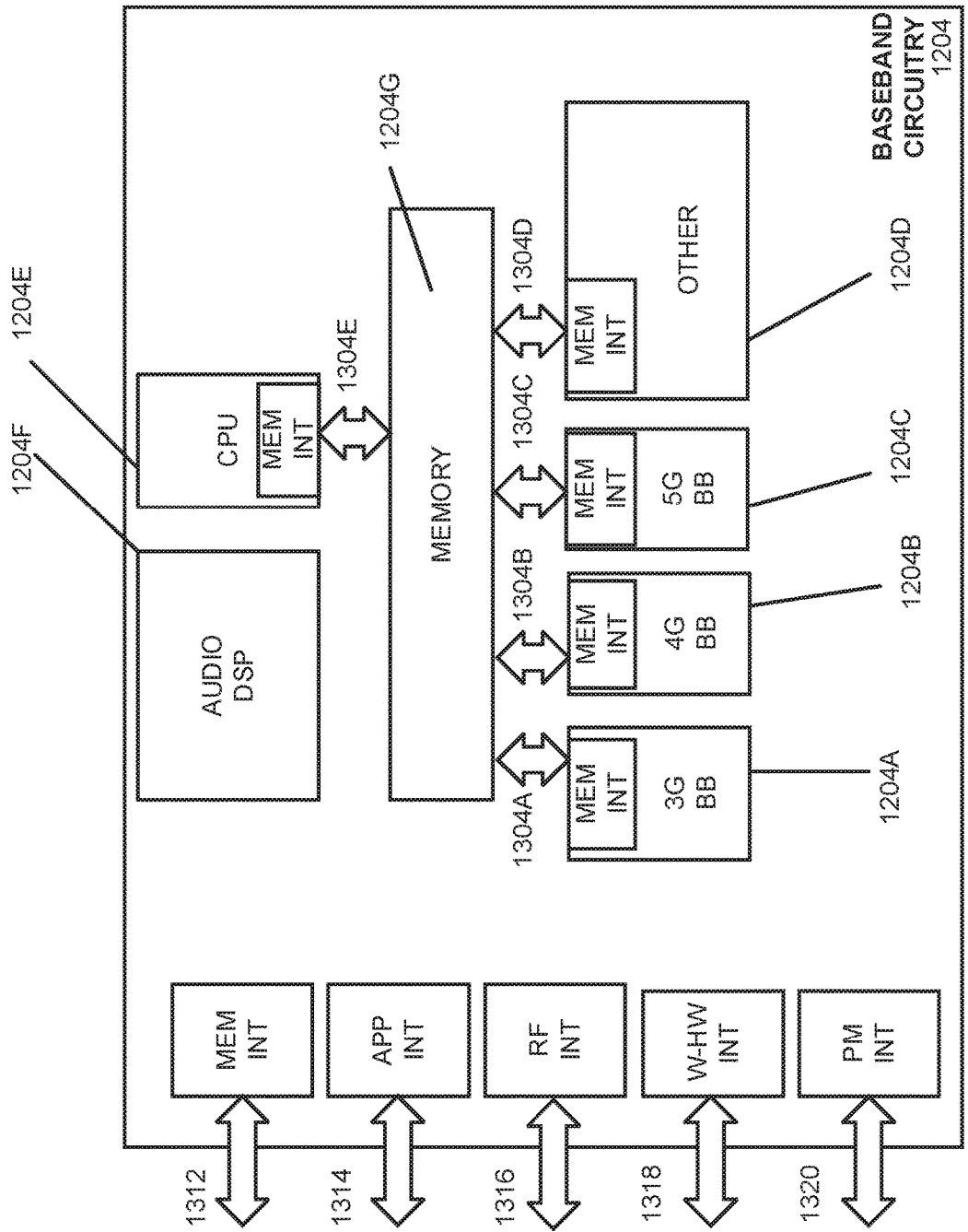
FIG. 13 illustrates example interfaces of baseband circuitry, in accordance with an example.

FIG. 13 illustrates example interfaces of baseband circuitry in accordance with some embodiments. As discussed above, the baseband circuitry 1204 of FIG. 12 may comprise processors 1204A-1204E and a memory 1204G utilized by said processors. Each of the processors 1204A-1204E may include a memory interface, 1304A-1304E, respectively, to send/receive data to/from the memory 1204G.

The baseband circuitry 1204 may further include one or more interfaces to communicatively couple to other circuitries/devices, such as a memory interface 1312 (e.g., an interface to send/receive data to/from memory external to the baseband circuitry 1204), an application circuitry interface 1314 (e.g., an interface to send/receive data to/from the application circuitry 1202 of FIG. 12), an RF circuitry interface 1316 (e.g., an interface to send/receive data to/from RF circuitry 1206 of FIG. 12), a wireless hardware connectivity interface 1318 (e.g., an interface to send/receive data to/from Near Field Communication (NFC) components, Bluetooth® components (e.g., Bluetooth® Low Energy), Wi-Fi® components, and other communication components), and a power management interface 1320 (e.g., an interface to send/receive power or control signals to/from the PMC 1212.

Figure 14:
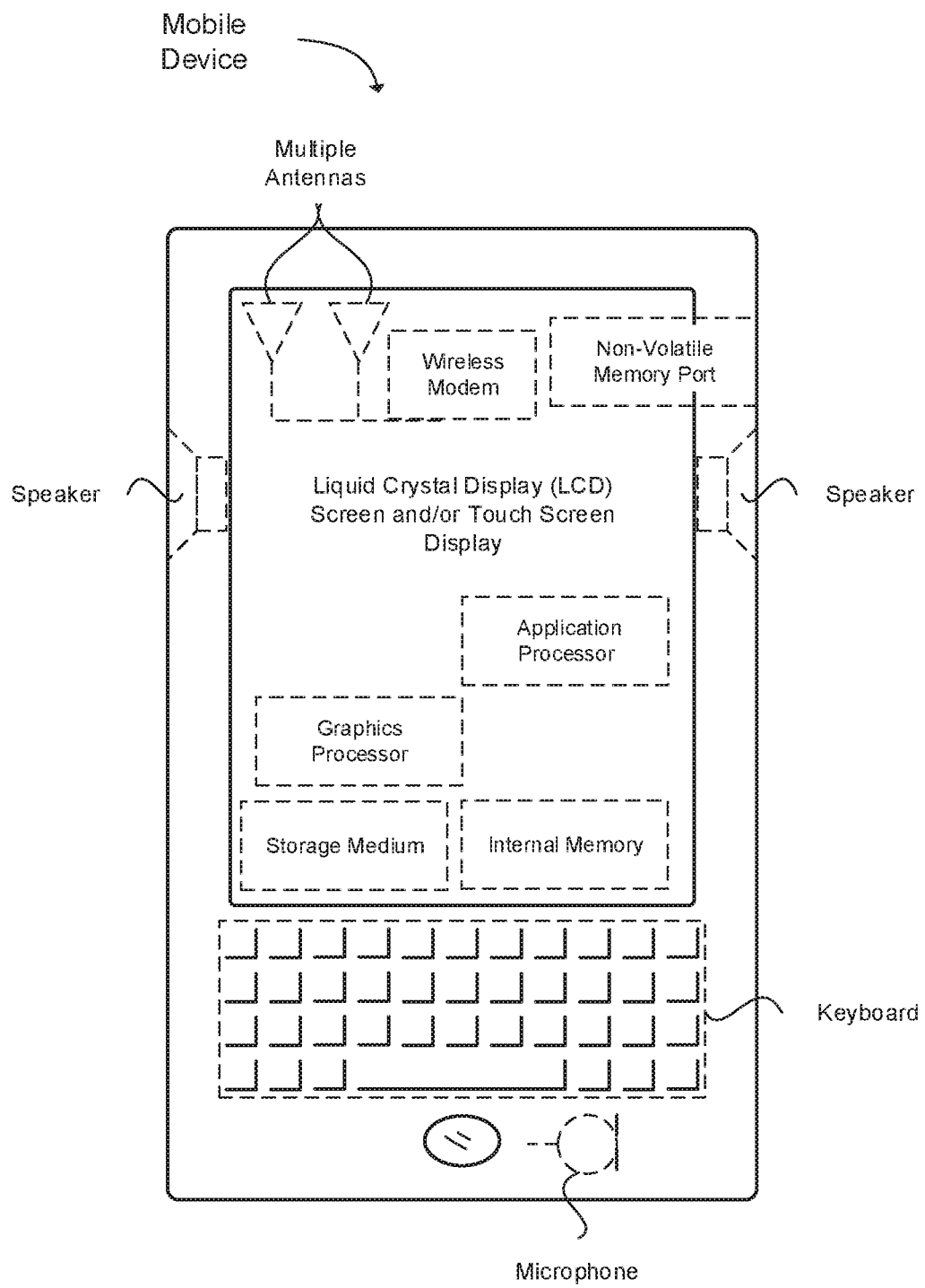
FIG. 14 illustrates a diagram of a wireless device (e.g., UE), in accordance with an example.

FIG. 14 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN) or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 14 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

EXAMPLES

The following examples pertain to specific technology embodiments and point out specific features, elements, or actions that can be used or otherwise combined in achieving such embodiments.

Example 1 includes an apparatus of a user equipment (UE), operable to perform a random-access procedure using a UE-specific control resource set (CORESET), the apparatus comprising: one or more processors configured to: decode a message, received from the next generation node B (gNB), to perform a contention free random-access (RA) procedure; encode a random-access channel (RACH) preamble for transmission to the gNB using one or more UE-specific CORESET; decode a random-access response (RAR) received from the gNB in response to the RACH preamble transmission using the one or more UE-specific CORESET; and a memory interface configured to store in a memory the RAR.

Example 2 includes the apparatus of example 1, wherein the one or more processors are further configured to encode the RACH preamble using a cell radio network temporary identifier (C-RNTI) for transmission to the gNB.

Example 3 includes the apparatus of example 1, wherein the one or more processors are further configured to decode the RAR using a cell radio network temporary identifier (C-RNTI).

Example 4 includes the apparatus of example 1, wherein the one or more processors are further configured to encode the RACH preamble using a cell radio network temporary identifier (C-RNTI) for transmission to the gNB, wherein the one or more UE-specific CORESET is comprised of a predetermined set of resource element groups (REGs).

Example 5 includes the apparatus of example 1, wherein the one or more processors are further configured to monitor a common CORESET for reception of the RAR, wherein the RAR of the common CORESET is configured to be decoded using a random access radio network temporary identifier (RA-RNTI).

Example 6 includes the apparatus of example 1, wherein the one or more processors are further configured to: encode a random access procedure message 3 for transmission to the gNB using a cell radio network temporary identifier (C-RNTI); and decode a random access procedure message 4 received from the gNB using a C-RNTI.

Example 7 includes the apparatus of example 1, wherein the one or more processors are further configured to: decode a radio resource control (RRC) reconfiguration message, received from the gNB, identifying a second UE-specific CORESET for the UE; monitor a common CORESET at the UE, for scheduling, for a predetermined time period after the RRC reconfiguration message is received; monitor the second UE-specific CORESET after the predetermined time period.

Example 8 includes the apparatus of example 7, wherein the predetermined time period is predetermined in a specification, configured by higher layer signaling, or based on a specific implementation of a gNB.

Example 9 includes an apparatus of a next generation node B (gNB), operable to perform a random-access procedure using a plurality of control resource sets (CORESETs), the apparatus comprising: one or more processors configured to: define a first common CORESET sized for a number M of blind decodings by a user equipment (UE), wherein M is a positive integer; define a UE-specific CORESET sized for a number M–K of blind decodings, wherein K is a positive integer less than M; define a second common CORESET sized for the number K of blind decodings by a user equipment (UE), when the UE-specific CORESET is in use; perform a random access channel (RACH) procedure using one or more of the first common CORESET, the second common CORESET, or the UE-specific CORESET; and a memory interface configured to store in a memory the number M–K.

Example 10 includes the apparatus of example 9, wherein the one or more processors are configured to: decode a random-access channel (RACH) preamble transmission received from a UE; and encode a random access response (RAR) message using the first common CORESET.

Example 11 includes the apparatus of example 9, wherein the one or more processors are further configured to: encode a message for transmission to the UE, to perform a contention free random-access (RA) procedure; decode a random-access channel (RACH) preamble received from the UE using the UE-specific CORESET sized for the number M–K of blind decodings; and encode a random-access response (RAR) for transmission to the gNB in response to the RACH preamble transmission using the UE-specific CORESET; and monitor the second common CORESET sized for the number K of blind decodings.

Example 12 includes an apparatus of next generation node B (gNB), operable to perform a random-access procedure using a plurality of control resource sets (CORESETs), the apparatus comprising: one or more processors configured to: define a common CORESET associated with a first set of resource element groups (REGs); define a common search space within the first set of REGs wherein the common search space comprises physical downlink control channel (PDCCH) candidates derived from a group identification (ID); define a UE-specific search space within the first set of REGs wherein the UE-specific search space comprises PDCCH candidates derived from a UE-specific ID (UE ID); define a UE-specific CORESET associated with a second set of REGs that are different from the first set of REGs; perform a random access channel (RACH) procedure using one or more of the common CORESET, the UE-specific CORESET, the common search space or the UE-specific search space; and a memory interface configured to store in a memory the first set of REGs.

Example 13 includes the apparatus of example 12, wherein the one or more processors are further configured to decode a RACH preamble using a cell radio network temporary identifier (C-RNTI) to be received by the gNB.

Example 14 includes the apparatus of example 12, wherein the one or more processors are further configured to encode a random access response (RAR) using a cell radio network temporary identifier (C-RNTI).

Example 15 includes the apparatus of example 12, wherein the one or more processors are further configured to: encode a random access procedure message 2 for transmission to a user equipment (UE) using the PDCCH candidates of the UE ID; encode a random access procedure message 3 for transmission to the UE using the PDCCH candidates of the UE ID; and decode a random access procedure message 4 for reception from the UE using the PDCCH candidates of the UE ID.

Example 16 includes the apparatus of example 9, wherein the one or more processors are further configured to: encode a radio resource control (RRC) reconfiguration message, identifying the second UE-specific CORESET for the UE which is different from the first UE-specific CORESET; schedule, using the common CORESET at the gNB, control channel and shared channel information, for a predetermined time period after the RRC reconfiguration message is received; and schedule the control channel and shared channel information using the second UE-specific CORESET after the predetermined time period.

Example 17 includes the apparatus of example 16, wherein the predetermined time period is predetermined in a specification, configured by higher layer signaling, or based on a specific implementation of the gNB.

Example 18 includes a user equipment (UE), operable to perform a random-access procedure using a UE-specific control resource set (CORESET), the apparatus comprising: one or more processors configured to: decode a message, received from the next generation node B (gNB), to perform a contention free random-access (RA) procedure; encode a random-access channel (RACH) preamble for transmission to the gNB using a temporal UE-specific CORESET; decode a random-access response (RAR) received from the gNB in response to the RACH preamble transmission using the temporal UE-specific CORESET; and a memory interface configured to store in a memory the RAR.

Example 19 includes the apparatus of example 18, wherein the one or more processors are further configured to: monitor the temporal UE-specific CORESET for a predetermined time period; and monitor a non-temporal UE-specific CORESET after the predetermined time period.

Example 20 includes the apparatus of example 18, wherein the one or more processors are further configured to: decode a random access procedure message 2 using the common CORESET to identify information for the non-temporal UE-specific CORESET; and decode a message 3 or a message 4 using the non-temporal UE-specific CORESET.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). In one example, selected components of the transceiver module can be located in a cloud radio access network (C-RAN). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. An apparatus of a user equipment (UE), comprising:
one or more processors configured to:
decode a message, received from a base station, comprising configuration information enabling the UE to perform a contention free random-access (RA) procedure;
encode a random-access channel (RACH) preamble for transmission to the base station;
decode a random-access response (RAR) received from the base station on a first UE-specific control resource set (CORESET) in response to the RACH preamble transmission;
decode a radio resource control (RRC) reconfiguration message, received from the base station, identifying a second UE-specific CORESET for the UE;
monitor a common CORESET at the UE for a predetermined time period after the RRC reconfiguration message is received; and monitor the second UE-specific CORESET after the pre-determined time period; and a memory interface configured to store in a memory the RAR.

2. The apparatus of the UE of claim 1, wherein the one or more processors are further configured to encode the RACH preamble using a random access radio network temporary identifier (RA-RNTI) for transmission to the base station.

3. The apparatus of the UE of claim 1, wherein the one or more processors are further configured to decode the RAR using a random access radio network temporary identifier (RA-RNTI).

4. The apparatus of the UE of claim 1, wherein the one or more processors are further configured to encode the RACH preamble using a random access radio network temporary identifier (RA-RNTI), wherein the first UE-specific CORESET is comprised of a predetermined set of resource element groups (REGs).

5. The apparatus of the UE of claim 1, further comprising a transceiver configured to:

receive the random-access response (RAR) from the base station in response to the RACH preamble transmission.

6. The apparatus of the UE of claim 1, wherein the UE includes an antenna, a touch sensitive display screen, a speaker, a microphone, a graphics processor, an application processor, an internal memory, a non-volatile memory port, or combinations thereof.

7. At least one non-transitory machine readable storage medium having instructions embodied thereon that, when executed by one or more processors of a UE, cause the UE to:

decode a message, received from a base station, comprising configuration information enabling the UE to perform a contention free random-access (RA) procedure;

encode a random-access channel (RACH) preamble for transmission to the base station;

decode a random-access response (RAR) received from the base station on a first UE-specific control resource set (CORESET) in response to the RACH preamble transmission;

decode a radio resource control (RRC) reconfiguration message, received from the base station, identifying a second UE-specific CORESET for the UE;

monitor a common CORESET at the UE for a predetermined time period after the RRC reconfiguration message is received; and monitor the second UE-specific CORESET after the predetermined time period.

8. The at least one non-transitory machine readable storage medium of claim 7, wherein the instructions, when executed by the one or more processors, further cause the UE to:

encode the RACH preamble using a random access radio network temporary identifier (RA-RNTI) for transmission to the base station.

9. The at least one non-transitory machine readable storage medium of claim 7, wherein the instructions, when executed by the one or more processors, further cause the UE to:

decode the RAR using a random access radio network temporary identifier (RA-RNTI).

10. The at least one non-transitory machine readable storage medium of claim 7, wherein the instructions, when executed by the one or more processors, further cause the UE to:

encode the RACH preamble using a random access radio network temporary identifier (RA-RNTI), wherein the first UE-specific CORESET is comprised of a predetermined set of resource element groups (REGs).

11. A method of a user equipment (UE), comprising:

decoding a message, received from a base station, comprising configuration information enabling the UE to perform a contention free random-access (RA) procedure;

encoding a random-access channel (RACH) preamble for transmission to the base station;

decoding a random-access response (RAR) received from the base station on a first UE-specific CORESET in response to the RACH preamble transmission;

decoding a radio resource control (RRC) reconfiguration message, received from the base station, identifying a second UE-specific CORESET for the UE;

monitoring a common CORESET at the UE for a predetermined time period after the RRC reconfiguration message is received; and monitoring the second UE-specific CORESET after the pre-determined time period.

12. The method of claim 11, further comprising encoding the RACH preamble using a random access radio network temporary identifier (RA-RNTI) for transmission to the base station.

13. The method of claim 11, further comprising decoding the RAR using a random access radio network temporary identifier (RA-RNTI).

14. The method of claim 11, further comprising encoding the RACH preamble using a random access radio network temporary identifier (RA-RNTI), wherein the first UE-specific CORESET is comprised of a predetermined set of resource element groups (REGs).

* * * * *